United States Patent
Nakamoto et al.

(10) Patent No.: US 8,999,206 B2
(45) Date of Patent: Apr. 7, 2015

(54) COMPOSITE NANOPARTICLES AND MANUFACTURING METHOD THEREOF

(75) Inventors: Masami Nakamoto, Takarazuka (JP); Mari Yamamoto, Osaka (JP); Yukiyasu Kashiwagi, Kishiwada (JP); Yukio Yoshida, Osaka (JP); Hiroshi Kakiuchi, Osaka (JP); Shinsuke Matsumura, Osaka (JP)

(73) Assignees: Osaka Municipal Technical Research Institute, Osaka-shi (JP); Daiken Chemical Co., Ltd., Osaka-shi (JP)

(*) Notice: Subject to any disclaimer, the term of this patent is extended or adjusted under 35 U.S.C. 154(b) by 309 days.

(21) Appl. No.: 13/058,674

(22) PCT Filed: Aug. 6, 2009

(86) PCT No.: PCT/JP2009/063961
§ 371 (c)(1),
(2), (4) Date: Apr. 28, 2011

(87) PCT Pub. No.: WO2010/018781
PCT Pub. Date: Feb. 18, 2010

(65) Prior Publication Data
US 2011/0193033 A1    Aug. 11, 2011

(30) Foreign Application Priority Data
Aug. 11, 2008 (JP) .................. 2008-207523

(51) Int. Cl.
*H01B 1/02* (2006.01)
*B22F 1/00* (2006.01)
(Continued)

(52) U.S. Cl.
CPC .......... *B22F 1/0018* (2013.01); *B22F 9/18* (2013.01); *B22F 9/30* (2013.01); *B82Y 30/00* (2013.01);
(Continued)

(58) Field of Classification Search
USPC .......... 252/519.21, 519.3; 75/331; 420/501; 428/403; 977/773, 896; 524/262
See application file for complete search history.

(56) References Cited

U.S. PATENT DOCUMENTS 6,358,611 B1 *  3/2002  Nagasawa et al. .......... 428/403
7,648,554 B2     1/2010  Nakamoto et al.
(Continued)

FOREIGN PATENT DOCUMENTS

| JP | 06-128609 A | | 5/1994 |
| JP | 10-183207 A | | 7/1998 |
| JP | 11-273454 A | | 10/1999 |
| JP | 2004-273205 | * | 9/2004 |
| JP | 2004-273205 A | | 9/2004 |
| JP | 2005-298921 A | | 10/2005 |
| JP | 2006-052456 A | | 2/2006 |
| JP | 2006-152353 | * | 6/2006 |
| JP | 2007-63579 A | | 3/2007 |
| JP | 2007-63580 A | | 3/2007 |
| WO | WO-2004/012884 A1 | | 2/2004 |

OTHER PUBLICATIONS http://www.differencebetween.com/difference-between-alloy-and-vs-composite/.*

*Primary Examiner* — Khanh Tuan Nguyen
(74) *Attorney, Agent, or Firm* — Fox Rothschild LLP

(57) ABSTRACT

Metal nanoparticles having improved migration resistance are provided. The present invention relates to a method for manufacturing composite nanoparticles including obtaining composite nanoparticles containing at least silver and copper in a single particle by heat treating a mixture containing an organic silver compound and an organic copper compound at a temperature of 150° C. or more in a non-oxidative atmosphere in the presence of a tertiary amine compound represented by the general formula $R^1R^2R^3N$ (wherein $R^1$ through $R^3$ are optionally substituted alkyl groups or aryl groups that may be the same or different, $R^1$ through $R^3$ may be linked in a ring, and the number of carbon atoms in each of $R^1$ through $R^3$ is 5 through 18 and may be the same or different).

12 Claims, 16 Drawing Sheets

(51) Int. Cl.
  *B22F 9/18* (2006.01)
  *B22F 9/30* (2006.01)
  *B82Y 30/00* (2011.01)
  *C22C 1/04* (2006.01)

(52) U.S. Cl.
  CPC ............ *C22C 1/0425* (2013.01); *C22C 1/0466* (2013.01); *Y10S 977/773* (2013.01); *Y10S 977/896* (2013.01)

(56) References Cited

U.S. PATENT DOCUMENTS

| | | |
|---|---|---|
| 2006/0150776 A1 | 7/2006 | Nakamoto et al. |
| 2008/0087137 A1* | 4/2008 | Shim et al. ............ 75/331 |
| 2010/0033873 A1* | 2/2010 | Ishibashi et al. ........ 360/135 |
| 2010/0034693 A1* | 2/2010 | Li ........................ 420/501 |

* cited by examiner

TG CURVE OBTAINED FROM TG/DTA MEASUREMENT OF $C_{12}Ag/(C_7)_2Cu/(C_8)_3N$ (SILVER:COPPER = 5:5, 160°C, 24 h)

XRD ANALYSIS RESULTS FOR $C_{12}Ag/(C_7)_2Cu/(C_8)_3N$ (SILVER:COPPER = 5:5, 160°C, 24 h)

TEM IMAGE AND PARTICLE SIZE DISTRIBUTION OF $C_{12}Ag/(C_7)_2Cu/(C_8)_3N$ (SILVER:COPPER = 5:5, 160°C, 24 h)

TG CURVE OBTAINED FROM TG/DTA MEASUREMENT OF $C_{12}Ag/(C_7)_2Cu/(C_8)_3N$ (SILVER:COPPER = 5:5, 180°C, 4 h)

XRD ANALYSIS RESULTS FOR $C_{12}Ag/(C_7)_2Cu/(C_8)_3N$ (SILVER:COPPER = 5:5, 180°C, 4 h)

TEM IMAGE AND PARTICLE SIZE DISTRIBUTION OF $C_{12}Ag/(C_7)_2Cu/(C_8)_3N$ (SILVER:COPPER = 5:5, 180°C, 4 h)

TG CURVE OBTAINED FROM TG/DTA MEASUREMENT OF C₇Ag/(C₇)₂Cu/(C₈)₃N
(SILVER:COPPER = 5:5, 160°C, 24 h)

XRD ANALYSIS RESULTS FOR C₇Ag/(C₇)₂Cu/(C₈)₃N (SILVER:COPPER = 5:5, 160°C, 24 h)

TEM IMAGE AND PARTICLE SIZE DISTRIBUTION OF C₇Ag/(C₇)₂Cu/(C₈)₃N
(SILVER:COPPER = 5:5, 160°C, 24 h)

TG CURVE OBTAINED FROM TG/DTA MEASUREMENT OF $C_{17}Ag/(C_7)_2Cu/(C_8)_3N$ (SILVER:COPPER = 5:5, 160°C, 24 h)

XRD ANALYSIS RESULTS FOR $C_{17}Ag/(C_7)_2Cu/(C_8)_3N$ (SILVER:COPPER = 5:5, 160°C, 24 h)

TEM IMAGE AND PARTICLE SIZE DISTRIBUTION OF $C_{17}Ag/(C_7)_2Cu/(C_8)_3N$ (SILVER:COPPER = 5:5, 160°C, 24 h)

TG CURVE OBTAINED FROM TG/DTA MEASUREMENT OF $C_{13}Ag/(C_7)_2Cu/(C_8)_3N$
(SILVER:COPPER = 8:2, 160°C, 24 h)

XRD ANALYSIS RESULTS FOR $C_{13}Ag/(C_7)_2Cu/(C_8)_3N$ (SILVER:COPPER = 8:2, 160°C, 24 h)

TEM IMAGE AND PARTICLE SIZE DISTRIBUTION OF $C_{13}Ag/(C_7)_2Cu/(C_8)_3N$
(SILVER:COPPER = 8:2, 160°C, 24 h)

TG CURVE OBTAINED FROM TG/DTA MEASUREMENT OF C₇Ag/(C₇)₂Cu/(C₈)₃N
(SILVER:COPPER = 8:2, 160℃, 24 h)

XRD ANALYSIS RESULTS FOR C₇Ag/(C₇)₂Cu/(C₈)₃N (SILVER:COPPER = 8:2, 160℃, 24 h)

TEM IMAGE AND PARTICLE SIZE DISTRIBUTION OF C₇Ag/(C₇)₂Cu/(C₈)₃N
(SILVER:COPPER = 8:2, 160℃, 24 h)

TG CURVE OBTAINED FROM TG/DTA MEASUREMENT OF $C_{17}Ag/(C_7)_2Cu/(C_8)_3N$ (SILVER:COPPER = 8:2, 160°C, 24 h)

XRD ANALYSIS RESULTS FOR $C_{17}Ag/(C_7)_2Cu/(C_8)_3N$ (SILVER:COPPER = 8:2, 160°C, 24 h)

TEM IMAGE AND PARTICLE SIZE DISTRIBUTION OF $C_{17}Ag/(C_7)_2Cu/(C_8)_3N$ (SILVER:COPPER = 8:2, 160°C, 24 h)

XRD ANALYSIS RESULTS FOR C₁₂Ag/(C₇)₂Cu/(C₈)₂N (SILVER:COPPER = 2:8, 160°C, 24 h)

TEM IMAGE AND PARTICLE SIZE DISTRIBUTION OF C₁₂Ag/(C₇)₂Cu/(C₈)₂N (SILVER:COPPER = 2:8, 160°C, 24 h)

TG CURVE OBTAINED FROM TG/DTA MEASUREMENT OF C₁₂Ag/(C₇)₂Cu/(C₈)₂N (SILVER:COPPER = 5:5, 180°C, 4 h)

XRD ANALYSIS RESULTS FOR C₁₃Ag/(C₇)₂Cu/(C₈)₃N (SILVER:COPPER = 5:5, 180°C, 4 h)

TEM IMAGE AND PARTICLE SIZE DISTRIBUTION OF C₁₃Ag/(C₇)₂Cu/(C₈)₃N (SILVER:COPPER = 5:5, 180°C, 4 h)

Cu:Ag=95:5

COMPOSITE NANOPARTICLES AND MANUFACTURING METHOD THEREOF

INCORPORATION BY REFERENCE

This application is a 371 of International Application No. PCT/JP2009/063961 filed Aug. 6, 2009, which claims priority to Japanese Patent Application No. 2008-207523 filed Aug. 11, 2008, the entire contents of which being hereby incorporated herein by reference.

TECHNICAL FIELD

The present invention relates to composite nanoparticles and a manufacturing method thereof.

BACKGROUND ART

Metal nanoparticles are ultrafine particles 1 to 100 nm in diameter, which are known to fuse together spontaneously due to the extreme instability of the atoms on the particle surfaces, forming coarser particles. It is therefore normal to stabilize metal nanoparticles by covering the surfaces with organic protective groups. Unlike bulk metal, metal nanoparticles exhibit the characteristic properties of low melting point and low-temperature sintering, and are used in conductive pastes for wiring formation in engineering applications.

Metal nanoparticles are often classified according to the method of synthesis. Methods of metal nanoparticle synthesis are classified generally into two types: physical methods in which bulk metal is pulverized to obtain particles, and chemical methods in which zero-valent metal atoms are produced from a metal salt, metal complex or other precursor, and then aggregated to obtain nanoparticles. One physical method is pulverization, in which a ball mill or other device is used to grind metal down into smaller pieces, thereby producing metal nanoparticles. However, the particles obtained by this method have a broad particle size distribution, and it is difficult to obtain particles hundreds of nanometers or less in size. Chemical methods include 1) the laser synthesis method, in which metal nanoparticles are synthesized by heating a reactive gas with a $CO_2$ laser, 2) the spray pyrolysis method, in which metal nanoparticles are obtained by spraying a metal salt solution in a high-temperature atmosphere, causing instantaneous evaporation and pyrolysis of the solution, and 3) the reduction method, in which metal nanoparticles are obtained by a reduction reaction from a metal salt solution, but none of these methods are suited to quantity synthesis.

To resolve these problems of existing metal nanoparticle synthesis methods, the inventors in this case developed a thermal decomposition control method whereby a metal nanoparticle can be synthesized simply by heating a metal complex as the metal source in the absence of a solvent (Patent Document 1, Patent Document 2, etc.). The primary feature of this thermal decomposition control method is the simplicity of heating in the absence of a solvent, which allows for quantity synthesis. It has also been found that adding an organic compound or the like with a mild reducing character to the reaction system serves to moderate the reaction conditions, and design of the particle diameter, shape, surface protective layer and the like is also possible.

Metal nanoparticles are being actively studied for industrial application in a variety of fields, including microwiring technologies using metal nanoparticles. Because the surfaces of metal nanoparticles are covered with an organic protective layer, they are highly solvent-dispersible, and wiring at lower temperatures than before is anticipated using the characteristic low-temperature fusion property of nanoparticles. At present, most applications involve wiring materials using silver nanoparticles, but silver is rare and therefore expensive, and it is also considered problematic because when used under conditions of high humidity it is extremely liable to a phenomenon called migration, in which the silver ionizes and is re-deposited outside the circuits, causing short-circuits between electrodes. There is therefore a need for the development of nanoparticles that will be less expensive more resistant to migration.

As a method for manufacturing metal nanoparticles, a method has been proposed whereby starting materials including a metal salt are heat-treated in an inactive gas atmosphere in the presence of an amine compound (Patent Document 1). A method has also been proposed for manufacturing composite metal ultrafine particles by heat-treating a starting materials including a metal salt in an inactive gas atmosphere, wherein the starting materials include (1) two or more kinds of metal and (2) at least one of N and O (Patent Document 2). Metal nanoparticles with excellent dispersion stability can be provided by these manufacturing methods.

However, the metal nanoparticles obtained by these manufacturing methods could still use further improvement in terms of migration resistance.

Patent Document 1: Japanese Patent Application Publication No. 2007-63579
Patent Document 2: Japanese Patent Application Publication No. 2007-63580
Patent Document 3: WO 2004/012884
Patent Document 4: Japanese Patent Application Publication No. 2005-298921

DISCLOSURE OF THE INVENTION

Consequently, the principal object of the present invention is to provide metal nanoparticles with still greater migration resistance.

In light of the problems of prior art, the inventors in this case discovered as a result of exhaustive research that the aforementioned object could be achieved by means of nanoparticles manufactured under fixed conditions using specific starting materials.

That is, the present relates to the following composite nanoparticles and manufacturing method therefor.

1. A method for manufacturing composite nanoparticles, comprising a step of obtaining composite nanoparticles containing at least silver and copper in a single particle by heat treating a mixture containing an organic silver compound and an organic copper compound at a temperature of 150° C. or more in a non-oxidative atmosphere in the presence of a tertiary amine compound represented by the general formula $R^1R^2R^3N$ (wherein $R^1$ through $R^3$ are optionally substituted alkyl groups or aryl groups that may be the same or different, $R^1$ through $R^3$ may be linked in a ring, and the number of carbon atoms in $R^1$ through $R^3$ is 1 through 18 and may be the same or different).

2. The manufacturing method according to 1 above, wherein $0.8 A \leq A' \leq 1.2 A$ is satisfied given A as an input molar ratio of the organic silver compound relative to the total of the organic silver compound and the organic copper compound, and A' as a molar ratio of a silver component relative to the total of the silver component and a copper component in the composite nanoparticles.

3. The manufacturing method according to 1 above, wherein a 1,2-alkanediol with 5 or more carbon atoms and/or a derivative thereof is further included.

4. The manufacturing method according to 1 above, wherein the heat treatment temperature is 250° C. or less.

5. The manufacturing method according to 1 above, wherein the input molar ratio A is at least 1% but no more than 99%.

6. The manufacturing method according to 1 above, wherein the organic silver compound is a fatty acid silver and the organic copper compound is a fatty acid copper.

7. Composite nanoparticles comprising an organic component and containing at least silver and copper in a single particle, wherein particles containing more silver than copper are mixed with particles containing more copper than silver.

8. The composite nanoparticles according to 7 above, wherein the molar ratio of the silver component relative to the total of the silver component and the copper component in the composite nanoparticles is at least 1% but no more than 99%.

9. The composite nanoparticles according to 7 above, which are used for forming migration-resistant wiring.

10. The composite nanoparticles according to 7 above, which are used for migration-resistant bonding purposes.

11. A paste containing the composite nanoparticles according to 7 above, a solvent and at least one type of viscosity modifying resin.

12. A method for forming an electrical junction or electrical circuit, comprising a step of forming an electrical junction region or pattern using composite nanoparticles according to 7 above or a paste containing those particles, and a step of baking the electrical junction region or pattern in a reducing atmosphere at 400° C. or less to obtain an electrical junction or electrical circuit consisting of a baked body.

13. The method according to 12 above, wherein the internal structure of the baked body has a structure of composite nanoparticles fused with one another.

14. An electrical junction or electrical circuit according to 14 above, wherein the structure is a three-dimensional mesh structure.

15. An electrical junction or electrical circuit obtained by the formation method according to 12 above, wherein the internal structure of the baked body has a structure of composite nanoparticles fused with one another.

16. The electrical junction or electrical circuit according to 15 above, wherein the structure is a three-dimensional mesh structure.

Advantages of the Invention

With the manufacturing method of the present invention, it is possible to favorably manufacture composite nanoparticles containing silver and copper in a single particle. Nanoparticles containing both metals in a single particle have been difficult or impossible to manufacture with prior art, and the nanoparticles obtained with prior art have been composed of a mixture of silver particles and copper particles. By contrast, with the manufacturing method of the present invention it is possible to efficiently manufacture composite nanoparticles without depositing particles consisting of only one or the other component.

Another feature of the manufacturing method of the present invention is that composite nanoparticles can be obtained having a component ratio that is the same as or similar to the silver/copper input ratio of the raw material. In particular, composite nanoparticles with a composition similar to the input ratio can be obtained more reliably if a 1,2-alkanediol is included in the starting materials.

Because the composite nanoparticles of the present invention have a characteristic composition in which at least silver and copper are contained in a single particle, and comprise particles containing more silver than copper and particles containing more copper than silver, they can provide superior migration resistance to conventional metal nanoparticles (composite nanoparticles). Composite nanoparticles containing gold and silver and composite nanoparticles containing silver and palladium and the like for example are known from prior art, but are in need of improvement in terms of migration resistance and the like, and such improvement in migration resistance can be achieved by means of the composite nanoparticles of the present invention.

A variety of properties (such as catalytic activity, conductivity, ultraviolet shielding, heat ray shielding, antibacterial properties, antifouling properties, rust resistance, corrosion resistance and the like) can be obtained with composite nanoparticles of the present invention having such features. They can thus be used for a wide variety of applications, such as electronic materials (printed wiring, conductive materials, optical elements and the like), catalytic materials (high-speed reaction catalysts, sensors and the like), structural materials (far infrared materials, composite coat-forming materials and the like), ceramic and metal materials (sintering aids, coating materials and the like), medical materials and the like for example. In particular, when migration resistance is required, the composite nanoparticles of the present invention can be used favorably for wiring formation, and for bonding as a high-temperature solder substitute.

BEST MODE FOR CARRYING OUT THE INVENTION

1. Composite Nanoparticle Manufacturing Method

Figure 1:
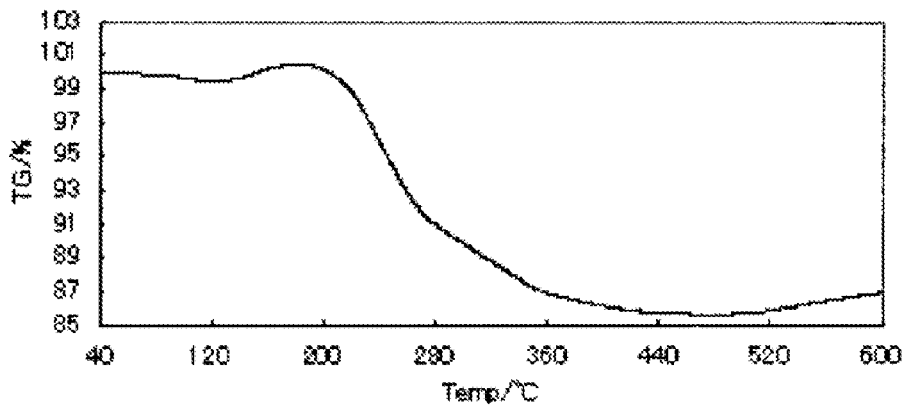
FIG. 1 shows the results for the thermogravimetric (TG) change according to TG/DTA measurement of the powder obtained in Example 1.

In the composite nanoparticle manufacturing method of the present invention, a mixture containing an organic silver compound and an organic copper compound is heat treated at a temperature of 150° C. or more in a non-oxidative atmosphere in the presence of a tertiary amine compound represented by the general formula $R^1R^2R^3N$ (wherein $R^1$ to $R^3$ independently represent an alkyl group or aryl group that may have a substituent, $R^1$ to $R^3$ may be linked together to form a cyclic structure, and the number of carbon atoms in $R^1$ to $R^3$ is 1 through 18 and may be the same or different), thereby obtaining composite nanoparticles containing at least silver and copper in a single particle.

An organic silver compound in the present invention may be a silver salt of an organic acid, or else silver carbonate, silver alkoxide, silver acetylacetonate or the like. One or two or more of these can be used.

A silver salt of an organic acid can be used by preference as the organic silver compound in the present invention. Examples of such silver salts include salts of stearic acid, naphthenic acid, octylic acid, octanic acid, benzoic acid, n-decanoic acid, paratoluic acid, butyric acid, caproic acid, palmitic acid, oleic acid, myristic acid, lauric acid, linoleic acid, linolenic acid, ricinoleic acid and other monocarboxylic acid salts as well as salts of malonic acid, succinic acid, maleic acid, fumaric acid, isophthalic acid, terephthalic acid, glutaric acid, adipic acid, tartaric acid, citric acid, pyruvic acid and other dicarboxylic acids and the like. Of these, it is desirable to use a silver salt of an organic acid with 5 or more (preferably 6 or more, especially 8 to 14) carbon atoms.

An organic copper salt in the present invention may be a copper salt of an organic acid, or else copper alkoxide, copper acetylacetonate or the like. One or two or more of these can be used.

A copper salt of an organic acid can be used by preference as the organic copper compound in the present invention. Examples of such copper salts include salts of stearic acid, naphthenic acid, octylic acid, octanic acid, benzoic acid, n-decanoic acid, paratoluic acid, butyric acid, caproic acid, palmitic acid, oleic acid, myristic acid, lauric acid, linoleic acid, linolenic acid, ricinoleic acid and other monocarboxylic acid salts as well as salts of malonic acid, succinic acid, maleic acid, fumaric acid, isophthalic acid, terephthalic acid, glutaric acid, adipic acid, tartaric acid, citric acid, pyruvic acid and other dicarboxylic acids and the like. Of these, it is desirable to use a copper salt of an organic acid with 5 or more (preferably 6 or more, especially 8 to 14) carbon atoms.

A compound represented by the general formula $R^1R^2R^3N$ (wherein $R^1$ through $R^3$ are optionally substituted alkyl groups or aryl groups that may be the same or different, $R^1$ through $R^3$ may be linked in a ring, and the number of carbon atoms in $R^1$ through $R^3$ is 1 through 18 and may be the same or different) is used as the tertiary amine compound. Examples of substituents include amino, halogen, nitro, nitroso, mercapto, sulfo, sulfino, hydroxyl, methoxy, ethoxy, cyano, carboxyl, carbonyl, phenyl, phenoxy, benzoyl and acetyl groups and the like for example. The number of carbon atoms in the aforementioned alkyl or aryl groups (including the number of carbon atoms in the substituents when such are present) is normally about 1 to 13 or especially 4 to 12 in the case of an alkyl group and normally about 6 to 18 or especially 6 to 12 in the case of an aryl group. Specific examples of preferred tertiary amine compounds include trioctylamine, tributylamine, triisobutylamine, N,N-diisopropylethylamine, tris(2 ethylhexyl)amine and the like. One or two or more of these can be used.

The amount of the tertiary amine compound used can be set appropriately according to the type of tertiary amine compound and the like, but is normally 100 to 300 moles or especially 150 to 250 moles per total 100 moles of the organic copper compound and organic silver compound.

In the manufacturing method of the present invention, an amine other than a tertiary amine (primary or secondary amine) can be included as long as it does not detract from the effects of the present invention, but heat treatment is preferably performed under conditions with no primary or secondary amine present. This allows a composite nanoparticle having the desired migration resistance to be reliably obtained.

In the manufacturing method of the present invention, it is also desirable that the method is performed in the presence of a 1,2-alkanediol with 5 or more carbon atoms and/or a derivative thereof (hereunder sometimes called "the diol of the invention"). A composite nanoparticle having a silver/copper composition closer to that of the input ratio can be obtained by including the diol of the invention. The number of carbon atoms is preferably at least 6, or more preferably at least 10, or still more preferably 12 to 30. Examples of such 1,2-alkanediols include 1,2-hexanediol, 1,2-octanediol, 1,2-nonanediol, 1,2-decanediol, 1,2-undecanediol, 1,2-dodecanediol, 1,2-tridecanediol and the like for example. The 1,2-alkanediol is preferably a straight-chain alkanediol. Examples of the aforementioned derivatives include those in which a hydrogen atom bonded to the carbon atom of the ethylene glycol is replaced with another substituent. Examples of the substituent in this case include amino, halogen, nitro, nitroso, mercapto, sulfa, sulfino, methoxy, ethoxy, cyano, carboxyl, carbonyl, phenyl, phenoxy, benzoyl and acetyl groups and the like for example. In the case of the aforementioned derivative, the number of carbon atoms includes the number of carbon atoms in the substituent.

The amount of the diol of the present invention is not limited, but is normally 100 to 300 moles or especially 150 to 250 moles per total 100 moles of the organic silver compound and organic copper compound.

In the present invention, heat treatment is performed at a temperature of 150° C. or more in a non-oxidative atmosphere. The designated composite nanoparticle can be obtained in this way.

The heat treatment atmosphere it not limited as long as it is non-oxidative, and may either an inactive gas or a reducing atmosphere or the like for example. In the present invention, it is especially desirable to perform heat treatment in an inactive gas. Nitrogen, carbon dioxide, argon, helium or the like can be use as the inactive gas.

The heat treatment temperature can normally be 150° C. or more, or preferably 160° C. or more. The upper limit can be a temperature less than the complete decomposition temperature of the organic copper compound or organic silver compound used, but is normally 250° C. or less. The complete decomposition temperature is the temperature at which the organic component of the organic copper compound or organic silver compound is completely decomposed. In the present invention, the temperature can be set appropriately within this range according to the type of organic copper compound and organic silver compound. For example, in the case of an organic copper compound or organic silver compound having a decomposition initiation temperature of about 100° C. and a complete decomposition temperature of about 400° C., the heat treatment temperature can be maintained within the range of 100 to 400° C. A heat treatment temperature in the range of 100 to 250° C. (especially 100 to 200° C.) is also desirable for example as described in the examples below.

The holding time of the heat treatment temperature can be set appropriately according to the heat treatment temperature, the type of organic copper compound or organic silver compound used and the like for example.

After completion of heat treatment, the product is cooled to room temperature and purified as necessary. Purification can be accomplished by a well-known purification method, such as centrifugation, membrane purification, solvent extraction or the like.

With the manufacturing method of the present invention, it is possible to obtain composite nanoparticles that preferably have a molar ratio A' of the silver component to the total of the silver component and the copper component in the composite nanoparticles (as a group of particles) that satisfies $0.8 A \leq A' \leq 1.2 A$ (especially $0.9 A \leq A' \leq 1.1 A$) given A as the input molar ratio of the organic silver compound relative to the total of the organic silver compound and organic copper compound. That is, composite nanoparticles (a group of particles) having a composition that is the same as or similar to that of the input ratio (silver component/copper component) can be obtained by the manufacturing method of the present invention. This can be controlled reliably by means of at least one of 1) the heat treatment temperature, 2) the silver/copper input ratio and 3) addition of the diol of the invention.

2. Silver-Copper Composite Nanoparticles

The composite nanoparticles of the present invention are composite nanoparticles comprising an organic component and containing at least silver and copper in a single particle, wherein particles are composed of particles containing more silver than copper in each particle and particles containing more copper than silver in each particle.

The composite nanoparticles of the present invention comprise an organic component, silver and copper. The composite nanoparticles of the present invention are preferably obtained by the aforementioned manufacturing method of the present invention. That is, the composite nanoparticles are preferably obtained by a composite nanoparticle manufacturing method wherein a mixture containing an organic silver compound and an organic copper compound is heat treated at a temperature of 150° C. or more in a non-oxidative atmosphere in the presence of a tertiary amine compound represented by the general formula $R^1R^2R^3N$ (wherein $R^1$ through $R^3$ are optionally substituted alkyl groups or aryl groups that may be the same or different, $R^1$ through $R^3$ may be linked in a ring, and the number of carbon atoms in each of $R^1$ through $R^3$ is 1 through 18 and may be the same or different), thereby obtaining composite nanoparticles containing at least silver and copper in each particle.

The organic component is not particular limited, but since the composite nanoparticles of the present invention are preferably obtained by the manufacturing method of the present invention, it preferably contains, as an organic solvent, at least one of the tertiary amine compound, organic silver compound and organic copper compound used as starting materials and a derived component of these compound. A derived component is preferably an organic component produced when the tertiary amine compound, organic silver compound and organic copper compound used as starting materials are subjected to the aforementioned heat treatment.

When a 1,2-alkanediol and/or derivative thereof is used, the organic component preferably contains at least one of the aforementioned tertiary amine compound, organic silver compound and organic copper compound and the 1,2-alkanediol and/or derivative thereof and a component derived from these. The derived component in this case is preferably an organic component produced when the tertiary amine compound, organic silver compound, organic copper compound and 1,2-alkanediol and/or derivative thereof used as starting materials are subjected to the aforementioned heat treatment.

The content of the organic component is not particularly limited, but is normally 55 wt % or less or especially 30 wt % or less. The minimum value of the content of the organic component is not particularly limited, but is normally about 0.5 wt %.

The ratio of silver to copper in the composite nanoparticles (group of particles) is not particularly limited as long as both are included in a single particle. Normally, the molar ratio of the silver component relative to the total of the silver component and copper component in the particle group is at least 1% but no acre than 99%, or preferably at least 5% but no more than 85%.

The composite nanoparticles of the present invention are a mixture of particles containing more silver than copper (hereunder sometimes called "silver-rich particles") and particles containing more copper than silver (hereunder sometimes called "copper-rich particles"). That is, silver-rich particles and copper-rich particles are mixed together. Such a composition can be verified by ordinary TEM/EDX measurement. Commercial equipment can be used for TEM/EDX measurement. Composite nanoparticles having such a feature can provide excellent migration resistance.

The mean particle diameter of the composite nanoparticles of the present invention is not particularly limited, but is normally about 3 to 300 nm or preferably 3 to 50 nm.

Because the composite nanoparticles of the present invention have excellent dispersion stability, a solubilized state can be obtained by dispersing them in a solvent for example. They can thus be used favorably in the form of a paste containing the composite nanoparticles, and at least one of a solvent and a viscosity modifying resin. The solvent is not particularly limited, and examples include terpene solvents, ketone solvents, alcohol solvents, ester solvents, ether solvents, aliphatic hydrocarbon solvents, aromatic hydrocarbon solvents, cellosolve solvents, carbitol solvents and the like. More specific examples include terpineol, methylethyl ketone, acetone, isopropanol, butyl carbitol, decane, undecane, tetradecane, benzene, toluene, hexane, diethyl ether, kerosene and other organic solvents. The viscosity modifying resin is not particularly limited, and for example phenol resins, melamine resins, alkyd resins and other thermosetting resins, phenoxy resins, acrylic resins and other thermoplastic resins, and epoxy resins and other curing agent-cured resins and the like can be used. When the composite nanoparticles are used in a paste, the content thereof in the paste can be set appropriately within the range of 20 to 90 wt %.

The present invention also encompasses a method for forming an electrical junction or electrical circuit, comprising 1) a step of forming an electrical junction region or pattern with the composite nanoparticles of the present invention or a paste containing the same, and 2) a step of baking the electrical junction region or pattern in a reducing atmosphere at 400° C. or less to obtain an electrical junction or electrical circuit.

The electrical junction region can be formed by methods similar to the soldering used to bond two circuits or the like for example. Known methods used for circuit formation, electrode formation or the like can be used for the step of forming the pattern. For example, the designated circuit pattern, electrode pattern or the like can be formed by a printing method such as screen printing, inkjet printing or the like.

Next, the electrical junction region or pattern is baked in a reducing atmosphere. It is thus possible to obtain an electrical junction or electrical circuit formed from a baked body. The baking temperature can be set appropriately according to the type of composite nanoparticles used, the paste composition and the like, but is normally 400° C. or less, or preferably 150 to 400° C., or more preferably 130 to 380° C., or most preferably 280 to 380° C. The reducing atmosphere can be an atmosphere containing reducing gas. For example, a mixed gas atmosphere containing 1 to 10 vol % hydrogen gas, with the remainder being inactive gas, can be adopted by preference. Argon gas, helium gas or the like or nitrogen gas can be used as the inactive gas. The baking time can be set appropriately according to the baking temperature and the like, but is normally about 1 to 10 hours.

Baking in air or in an oxidizing atmosphere can be performed as necessary before baking in the aforementioned reducing atmosphere. In this case, the baking temperature is normally 150 to 400° C. or preferably 280 to 380° C. This baking serves to reduce pore production, further increasing the density of the baked film and improving its electrical characteristics.

Thus, in the present invention a reducing atmosphere to thereby provide an electrical junction region or pattern (electrode pattern, circuit pattern or wiring pattern) that has excellent migration resistance and is highly conductive because a film can be formed having a structure of composite nanoparticles fused with one another can be obtained by baking (heat treating) the composite nanoparticles of the present invention or a paste containing the same. The electrical junction region or pattern is normally in the form of a film, the thickness of which is normally 1 to 50 µm or preferably 1 to 10 µm.

EXAMPLES

The features of the present invention are explained in more detail below using examples and comparative examples. However, the scope of the present invention is not limited by the examples.

(1) Reagents and Measurement Instruments

Reagents used in synthesis and measurement: 1,2-dodecanediol, trioctylamine, octanoic acid and silver carbonate purchased from Nacalai Tesque, Inc. and copper octanoate purchased from Mitsuwa Chemical Co. were used without further purification.

TG/DTA measurement: measured in a nitrogen atmosphere using a Seiko Electronics SSC/5200 Thermal Analyzer.

Powder X-ray diffractometer (XRD): Rigaku RINT2500.

Transmission electron microscopy (TEM): A JEOL JEM2100IM was used. The observation samples were prepared by adding toluene to composite nanoparticles, dispersing them by ultrasound irradiations, and dripping and drying the resulting liquid on a copper grid with a carbon support film.

Energy dispersive X-ray analysis (EDX): Performed using a JEOL JEM2100IM.

X-ray fluorescence analysis (XRF): Performed using a Seiko Instruments Microelement Monitor SEA5120.

(2) Chemical Notation

In these examples, the compounds are abbreviated as follows:

Fatty acid silver $C_mH_{2m+1}COOAg$ with different chain lengths: $C_mCOOAg$ (m=7, 13, 17)

Copper octoate $(C_7H_{15}COO)_2Cu$: $(C_7COO)_2Cu$

Trioctylamine $(C_8H_{17})_3N$: $(C_8)_3N$ 1,2-dodecanediol $C_{10}H_{21}CH(OH)CH_2(OH)$: 1,2-DDO Octanoic acid $C_7H_{15}COOH$: $C_7COOH$ Silver nanoparticle synthesized from $C_mCOOAg$ and $(C_8)_3N$: $C_mAg/(C_8)_3N$ (m=7, 13, 17)

Ag/Cu composite nanoparticles synthesized from $C_mCOOAg$, $(C_7COO)_2Cu$ and $(C_8)_3N$: $C_mAg/(C_7)_2Cu/(C_8)_3N$ (m=7, 13, 17) (input ratio, reaction temperature× reaction time)

Ag/Cu composite nanoparticles synthesized from $C_{13}COOAg$, $(C_7COO)_2Cu$, $(C_8)_3N$ and 1,2-DDO: $C_{13}Ag/(C_7)_2Cu/(C_8)_3N/1,2$-DDO (input ratio, reaction temperature×reaction time)

Ag/Cu composite nanoparticle synthesized from $Ag_2Co_3$, $(C_7COO)_2Cu$, $(C_8)_3N$ and $C_7COOH$: $Ag_2CO_3/(C_7)_2Cu/(C_8)_3N/C_7COOH$ (input ratio, reaction temperature×reaction time).

(3) Methods for Measuring Physical Properties

Mean particle diameter: this was measured with the aforementioned transmission electron microscope, and the arithmetic average of the diameters of 300 randomly selected particles was calculated and given as the mean particle diameter.

Content of metal component: determined by TG/DTA measurement using the aforementioned thermal analyser.

Example 1

Synthesis of $C_{13}Ag/(C_7)_2Cu/(C_8)_3N$

Figure 2:
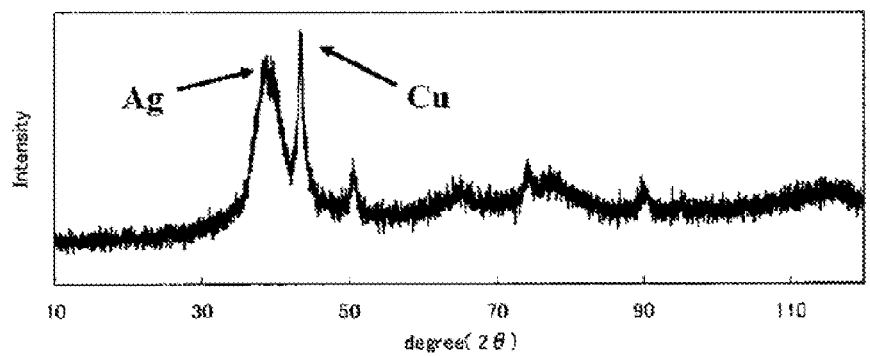
FIG. 2 snows the results of X-ray diffraction analysis (XRD) of the powder obtained in Example 1.
Figure 3:
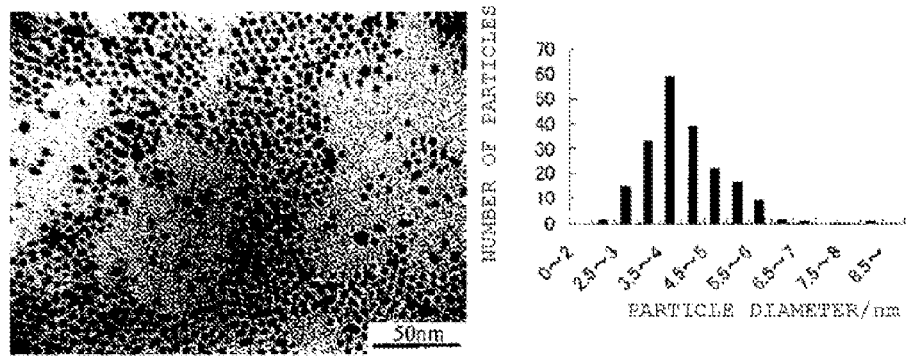
FIG. 3 shows a TEM image and the particle size distribution of the powder obtained in Example 1.

Silver:Copper=5:5, 160° C.×24 Hours $(C_8)_3N$ (2.7 g, 7.5 mmol), $(C_7COO)_2Cu$ (0.88 g, 2.5 mmol) and $C_{13}COOAg$ (0.84 g, 2.5 mmol) were maintained at 160° C. for 24 hours, and then cooled to room temperature. After cooling, this was washed with a mixture of acetone (10 ml) and methanol (10 ml), filtered with a Kiriyama funnel, and dried under reduced pressure to obtain a bluish-purple powder (yield 0.45 g, metal content 86%, compositional ratio silver 54 mol %:copper 46 mol %, mean particle diameter 4.1±0.87 nm). FIG. 1 shows the results for thermogravimetric (TG) change according to TG/DTA measurement, FIG. 2 shows the results of X-ray diffraction analysis (XRD), and FIG. 3 shows a TEM image and the particle size distribution of the resulting powder.

Example 2

Synthesis of $C_{13}Ag/(C_7)_2Cu/(C_8)_3N$

Silver:Copper=5:5, 160° C.×4 Hours

A bluish-purple powder (yield 0.43 g, metal content 80%, compositional ratio silver 71 mol %:copper 29 mol %) was obtained by a reaction similar to that of Example 1 except that the reaction time in Example 1 was changed from 24 hours to 4 hours.

Example 3

Synthesis of $C_{13}Ag/(C_7)_2Cu/(C_8)_3N$

Silver:Copper=5:5, 160° C.×16 Hours

A bluish-purple powder (yield 0.47 g, metal content 82%, compositional ratio silver 65 mol %:copper 35 mol %) was synthesized by a reaction similar to that of Example 1 except that the reaction time in Example 1 was changed from 24 hours to 16 hours.

Example 4

Synthesis of $C_{13}Ag/(C_7)_2Cu/(C_8)_3N$

Silver:Copper=5:5, 180° C.×4 Hours

Figure 4:
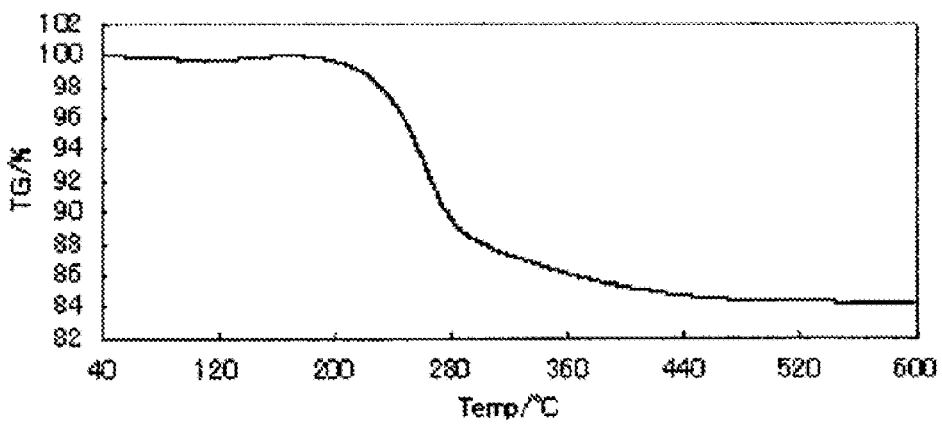
FIG. 4 shows the results for thermogravimetric (TG) change according to TG/DTA measurement of the powder obtained in Example 4.
Figure 5:
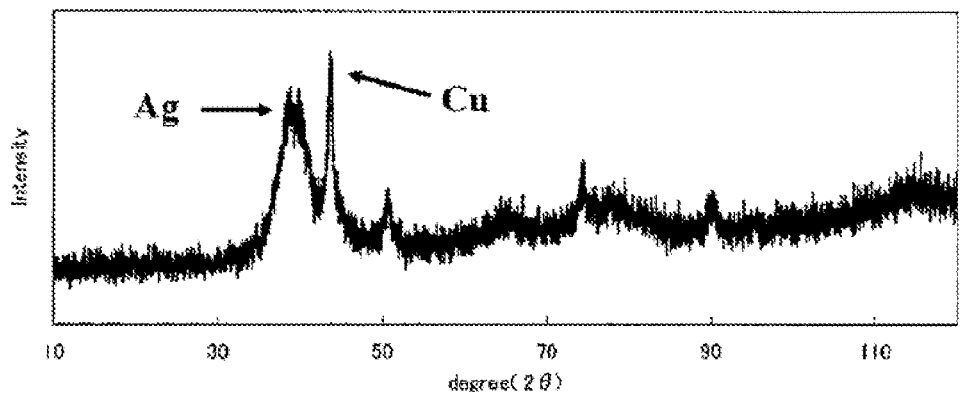
FIG. 5 shows the results of X-ray diffraction analysis (XRD) of the powder obtained in Example 4.
Figure 6:
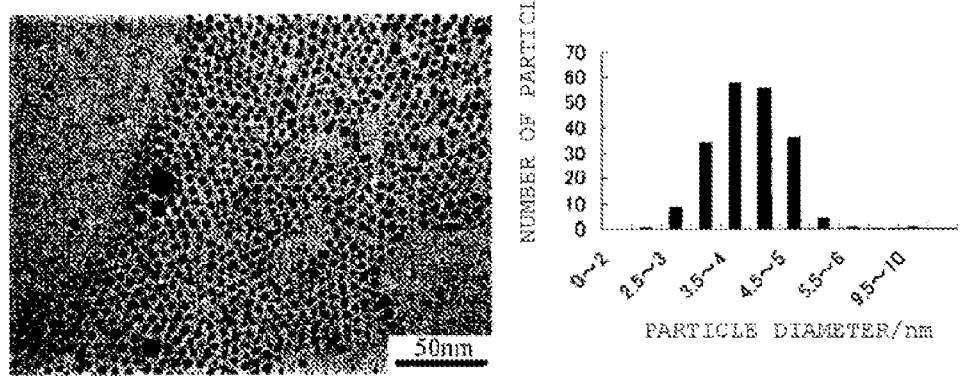
FIG. 6 shows a TEM image and the particle size distribution of the powder obtained in Example 4.

A bluish-purple powder (yield 0.49 g, metal content 84%, compositional ratio silver 50 mol %:copper 50 mol %, mean particle diameter 4.0±0.71 nm) was obtained by a reaction similar to that of Example 2 except that the reaction temperature in Example 2 was changed from 160° C. to 180° C. FIG. 4 shows the results for thermogravimetric (TG) change according to TG/DTA measurement, FIG. 5 shows the results of X-ray diffraction analysis (XRD), and FIG. 6 snows a TEM image and the particle size distribution of the resulting powder.

Example 5

Synthesis of $C_7Ag/(C_7)_2Cu/(C_8)_3N$

Silver:Copper=5:5, 160° C.×24 Hours

Figure 7:
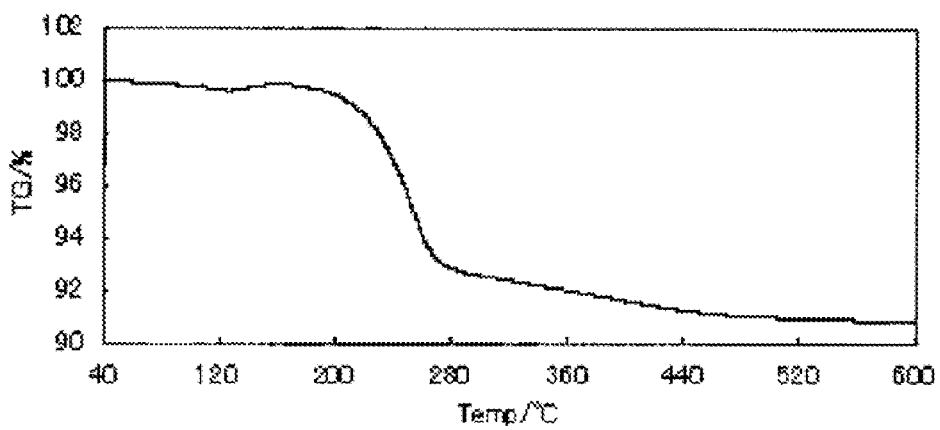
FIG. 7 shows the results for thermogravimetric (TG) change according to TG/DTA measurement of the powder obtained in Example 5.
Figure 8:
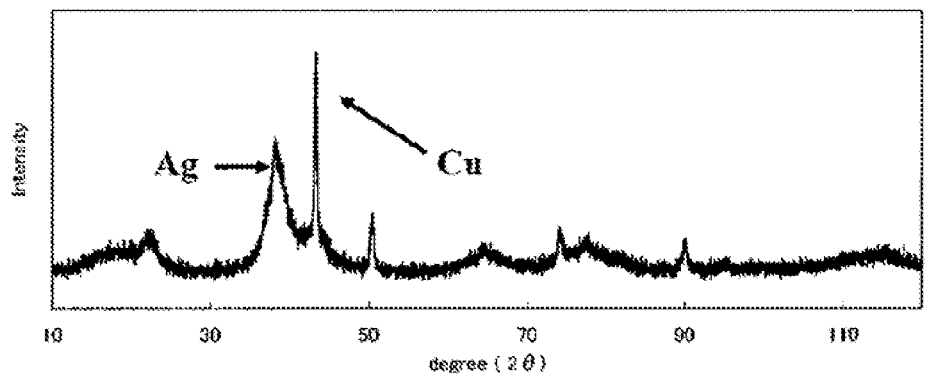
FIG. 8 shows the results of X-ray diffraction analysis (XRD) of the powder obtained in Example 5.
Figure 9:
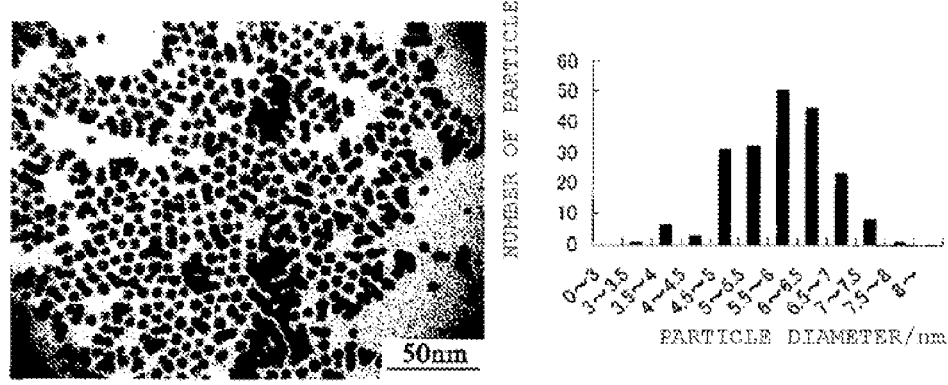
FIG. 9 shows a TEM image and the particle size distribution of the powder obtained in Example 5.

A bluish-purple powder (yield 0.40 g, metal content 91%, compositional ratio silver 58 mol %:copper 42 mol %, mean particle diameter 5.7±0.79 nm) was obtained by a reaction similar to that of Example 1 except that the fatty acid silver $C_{13}Ag$ used in Example 1 was changed in $C_7Ag$. FIG. 7 shows the results for thermogravimetric (TG) change according to TG/DTA measurement, FIG. 8 shows the results of X-ray diffraction analysis (XRD), and FIG. 9 shows a TEM image and the particle size distribution of the resulting powder.

Example 6

Synthesis of $C_{17}Ag/(C_7)_2Cu/(C_8)_3N$

Silver:Copper=5:5, 160° C.×24 Hours

Figure 10:
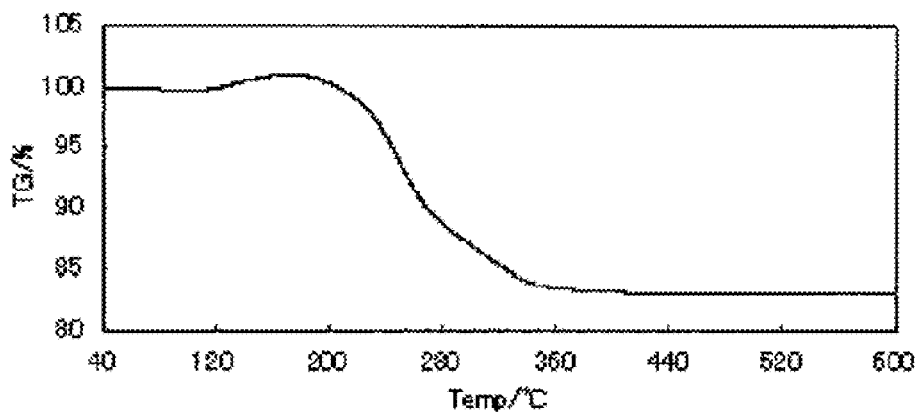
FIG. 10 shows the results for thermogravimetric (TG) change according to TG/DTA measurement of the powder obtained in Example 6.
Figure 11:
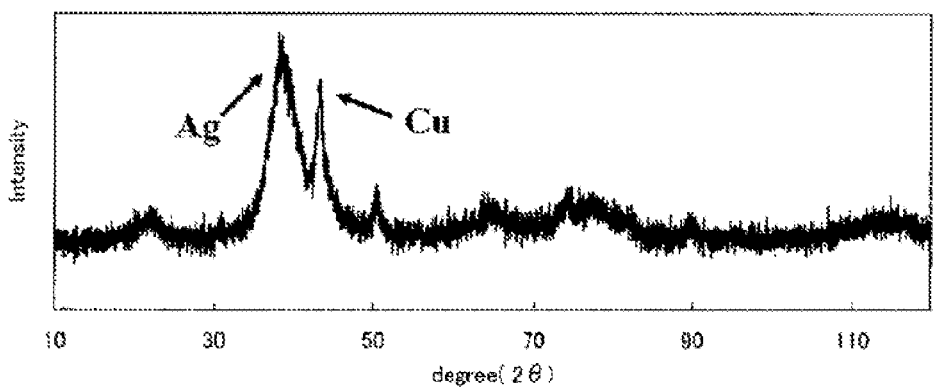
FIG. 11 shows the results of X-ray diffraction analysis (XRD) of the powder obtained in Example 6.
Figure 12:
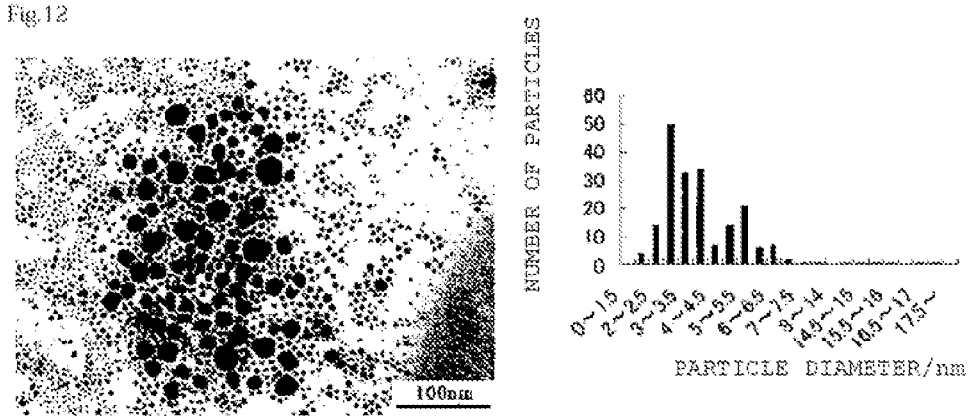
FIG. 12 shows a TEM image and the particle size distribution of the powder obtained in Example 6.

A bluish-purple powder (yield 0.52 g, metal content 83%, compositional ratio silver 58 mol %:copper 42 mol %, mean particle diameter 4.1±2.3 nm) was obtained by a reaction similar to that of Example 1 except that the fatty acid silver $C_{13}Ag$ used in Example 1 was changed to $C_{17}Ag$. FIG. 10 shows the results for thermogravimetric (TG) change according to TG/DTA measurement, FIG. 11 shows the results of X-ray diffraction analysis (XRD), and FIG. 12 shows a TEM image and the particle size distribution of the resulting powder.

Example 7

Synthesis of $C_{13}Ag/(C_7)_2Cu/(C_8)_3N$

Silver:Copper=8:2, 160° C.×24 Hours

Figure 13:
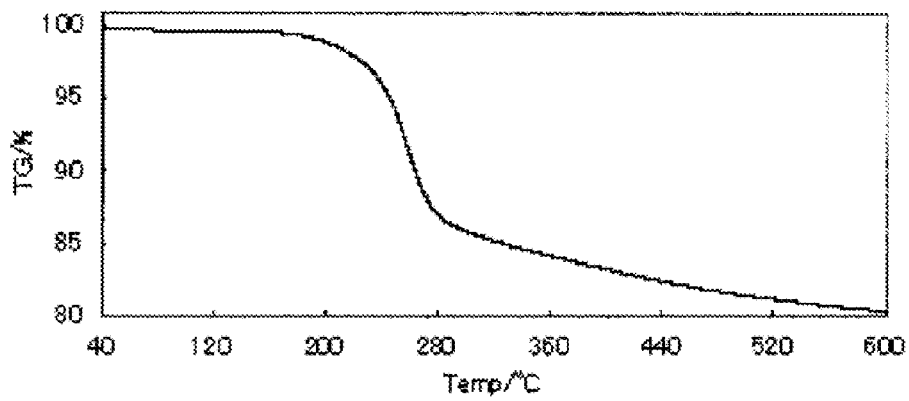
FIG. 13 snows the results for thermogravimetric (TG) change according to TG/DTA measurement of the powder obtained in Example 7.
Figure 14:
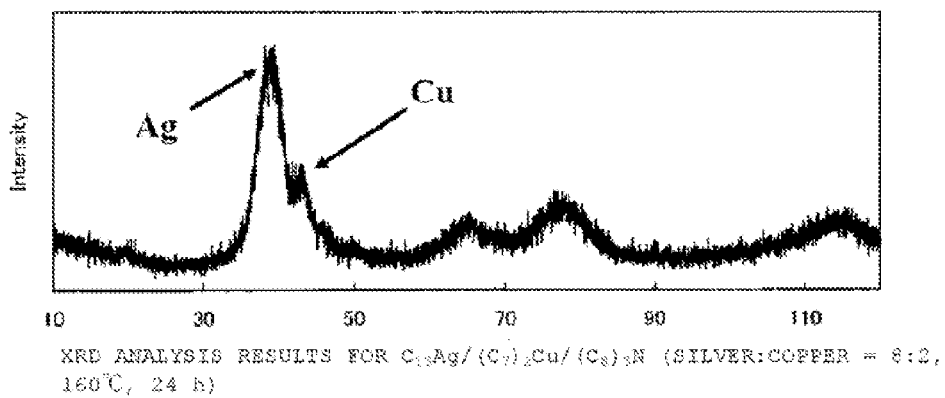
FIG. 14 shows the results of X-ray diffraction analysis (XRD) of the powder obtained in Example 7.
Figure 15:
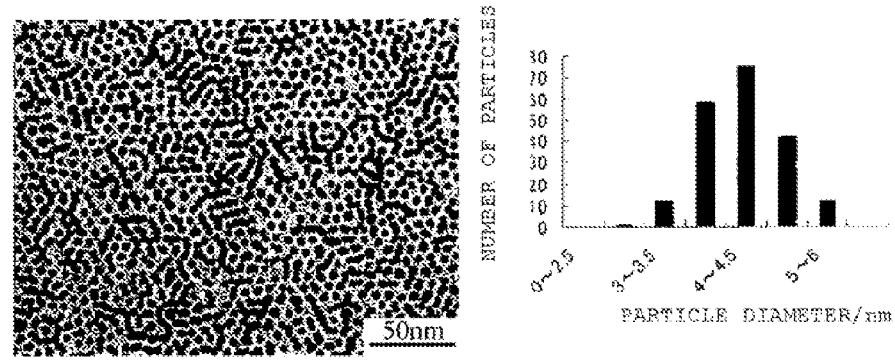
FIG. 15 shows a TEM image and the particle size distribution of the powder obtained in Example 7.

A bluish-purple powder (yield 0.44 g, metal content 80%, compositional ratio silver 89 mol %:copper 11 mol %, mean particle diameter 4.2±0.49 nm) was obtained by a reaction similar to that of Example 1 except that the amounts of the reagents added in Example 1 were changed to $(C_8)_3N$ (2.1 g, 6.0 mmol), $(C_7COO)_2Cu$ (0.35 g, 1.0 mmol) and $C_{13}COOAg$ (1.3 g, 4.0 mmol). FIG. 13 shows the results for thermogravimetric (TG) change according to TG/DTA measurement, FIG. 14 shows the results of X-ray diffraction analysis (XRD), and FIG. 15 shows a TEM image and the particle size distribution of the resulting powder.

Example 8

Synthesis of $C_7Ag/(C_7)_2Cu/(C_8)_3N$

Silver:Copper=8:2, 160° C.×24 Hours

Figure 16:
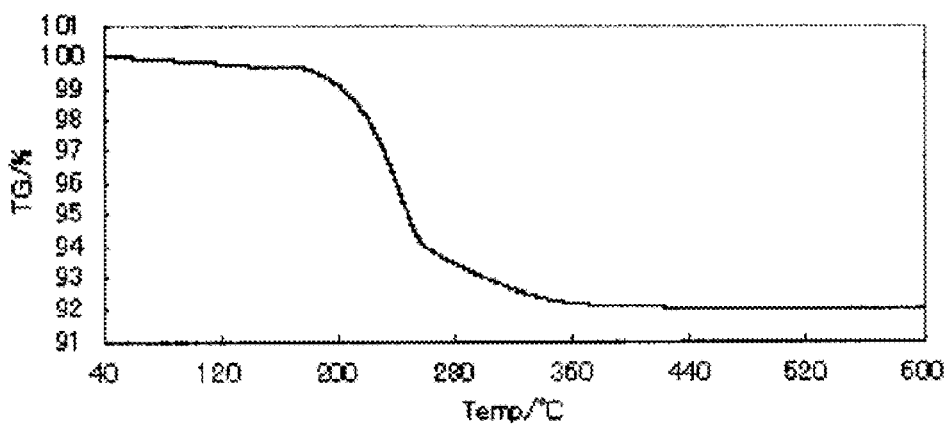
FIG. 16 shows the results for thermogravimetric (TG) change according to TG/DTA measurement of the powder obtained in Example 8.
Figure 17:
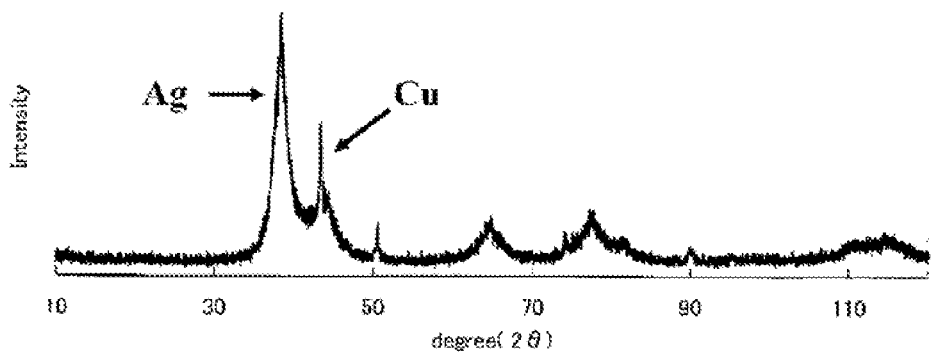
FIG. 17 shows the results of X-ray diffraction analysis (XRD) of the powder obtained in Example 8.
Figure 18:
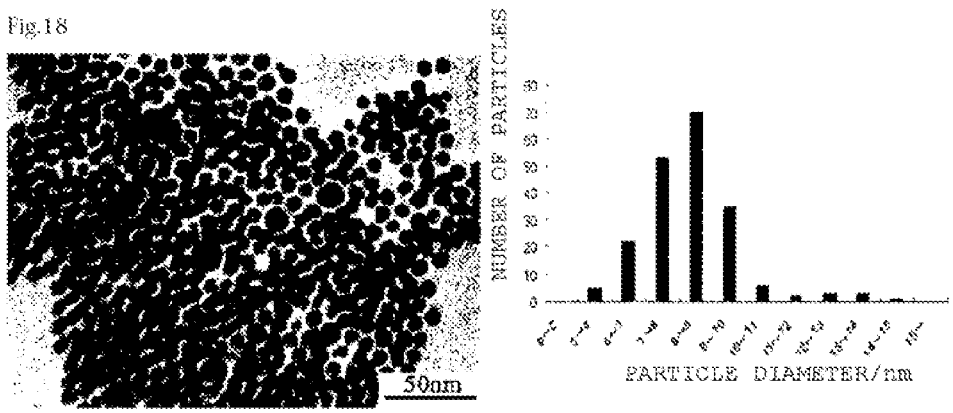
FIG. 18 shows a TEM image and the particle size distribution of the powder obtained in Example 8.

A bluish-purple powder (yield 0.50 g, metal content 92%, compositional ratio silver 95 mol %:copper 5 mol %, mean particle diameter 8.4±1.4 nm) was obtained by a reaction similar to that of Example 5 except that the amounts of the reagents added in Example 5 were changed to $(C_8)_3N$ (2.1 g, 6.0 mmol), $(C_7COO)_2Cu$ (0.35 g, 1.0 mmol) and $C_7COOAg$ (1.0 g, 4.0 mmol). FIG. 16 shows the results for thermogravimetric (TG) change according to TG/DTA measurement, FIG. 17 shows the results of X-ray diffraction analysis (XRD), and FIG. 18 snows a TEM image and the particle size distribution of the resulting powder.

Example 9

Synthesis of $C_{17}Ag/(C_7)_2Cu/(C_8)_3N$

Silver:Copper=8:2, 160° C.×24 Hours

Figure 19:
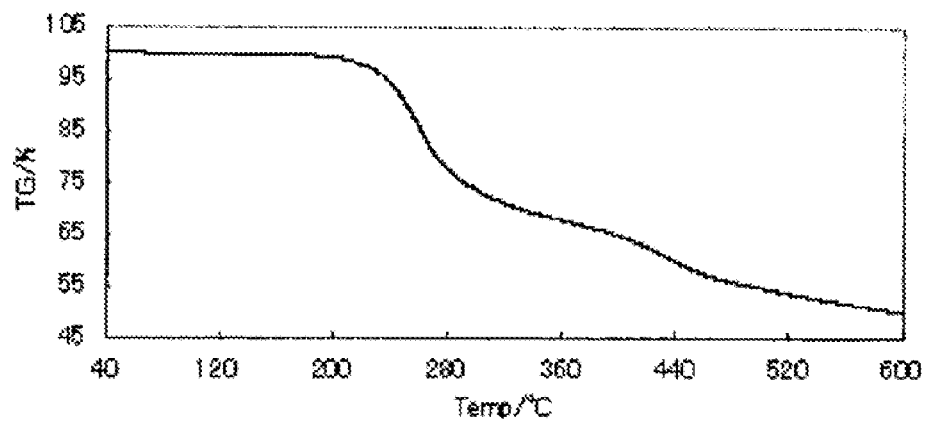
FIG. 19 shows the results for thermogravimetric (TG) change according to TG/DTA measurement of the powder obtained in Example 9.
Figure 20:
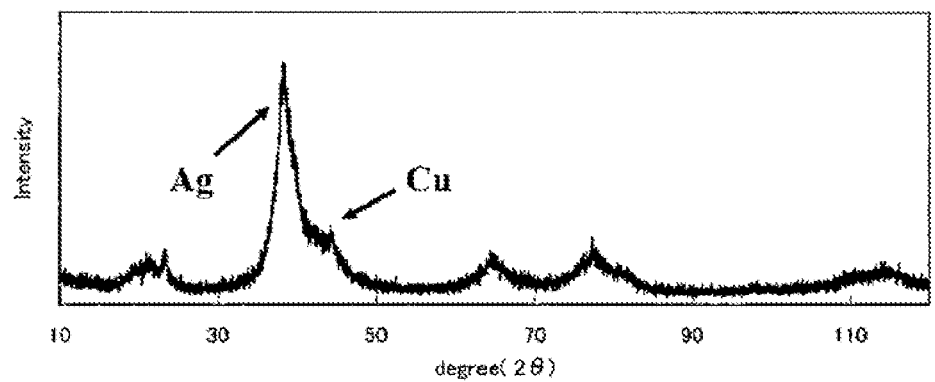
FIG. 20 shows the results of X-ray diffraction analysis (XRD) of the powder obtained in Example 9.
Figure 21:
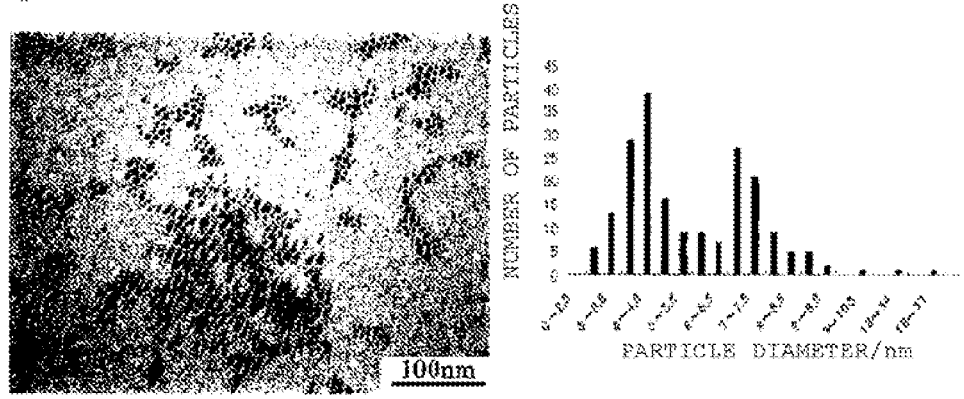
FIG. 21 shows a TEM image and the particle size distribution of the powder obtained in Example 9.

A bluish-purple powder (yield 0.95 g, metal content 50%, compositional ratio silver 96 mol %:copper 4 mol %, mean particle diameter 5.5±1.9 nm) was obtained by a reaction similar to that of Example 6 except that the amounts of the reagents added in Example 6 were changed to $(C_8)_3N$ (2.1 g, 6.0 mmol), $(C_7COO)_2Cu$ (0.35 g, 1.0 mmol) and $C_{17}COOAg$ (1.6 g, 4.0 mmol). FIG. 19 shows the results for thermogravimetric (TG) change according to TG/DTA measurement, FIG. 20 shows the results of X-ray diffraction analysis (XRD), and FIG. 21 shows a TEM image and the particle size distribution of the resulting powder.

Example 10

Synthesis of $C_{17}Ag/(C_7)_2Cu/(C_8)_3N$

Silver:Copper=2:8, 160° C.×16 Hours

Figure 22:
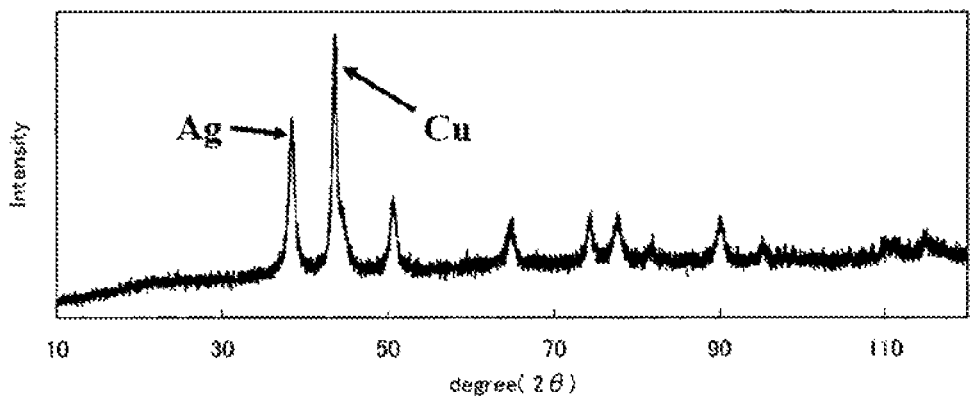
FIG. 22 shows the results of X-ray diffraction analysis (XRD) of the powder obtained in Example 10.
Figure 23:
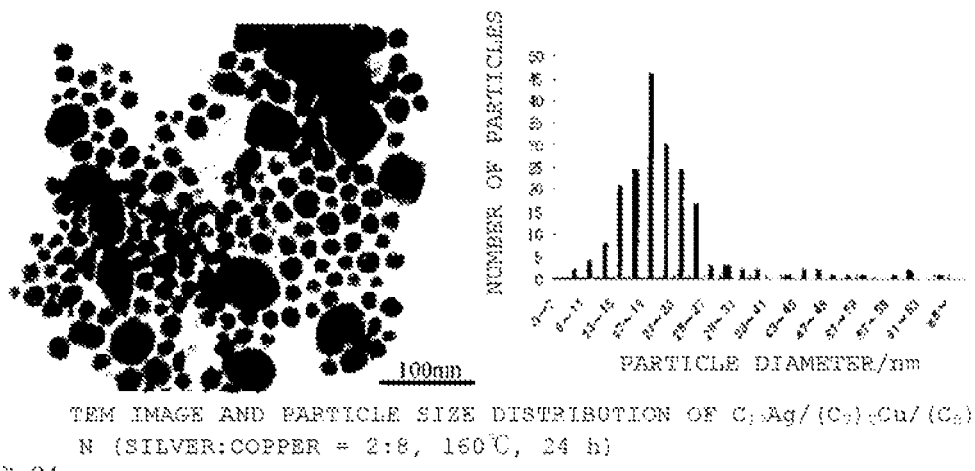
FIG. 23 shows a TEM image and the particle size distribution of the powder obtained in Example 10.

A bluish-purple powder (yield 0.22 g, metal content 99%, compositional ratio silver 41 mol %:copper 59 mol %, mean particle diameter 21±8.9 nm) was obtained by a reaction similar to that of Example 6 except that the amounts of the reagents added in Example 6 were changed to $(C_8)_3N$ (3.2 g, 9.0 mmol), $(C_7COO)_2Cu$ (1.4 g, 4.0 mmol) and $C_{17}COOAg$ (0.40 g, 1.0 mmol). FIG. 22 shows the results of X-ray diffraction analysis (XRD), and FIG. 23 shows a TEM image and the particle size distribution of the resulting powder.

Example 11

Synthesis of $C_{13}Ag/(C_7)_2Cu/(C_8)_3N$

Silver:Copper=5:5, 180° C.×4 Hours

Figure 24:
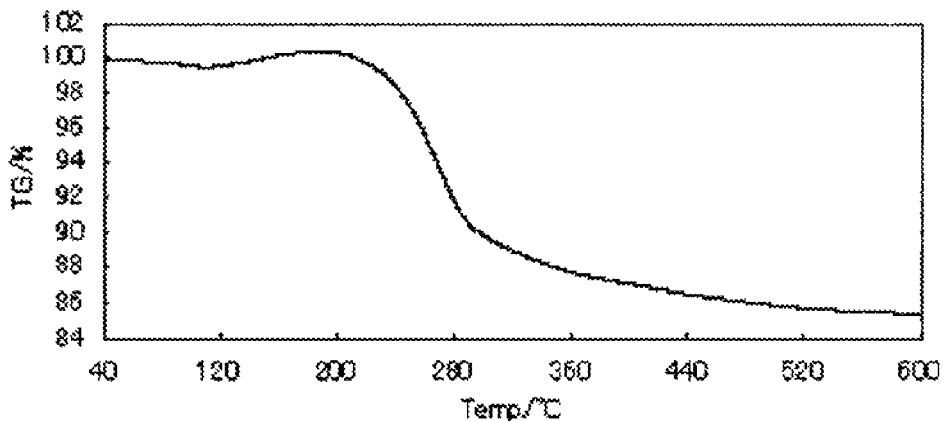
FIG. 24 snows the results for thermogravimetric (TG) change according to TG/DTA measurement of the powder obtained in Example 11.
Figure 25:
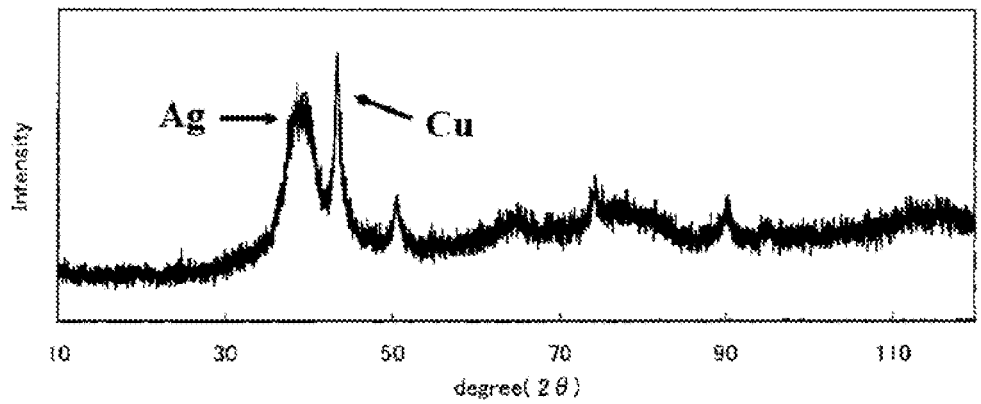
FIG. 25 shows the results of X-ray diffraction analysis (XRD) of the powder obtained in Example 11.
Figure 26:
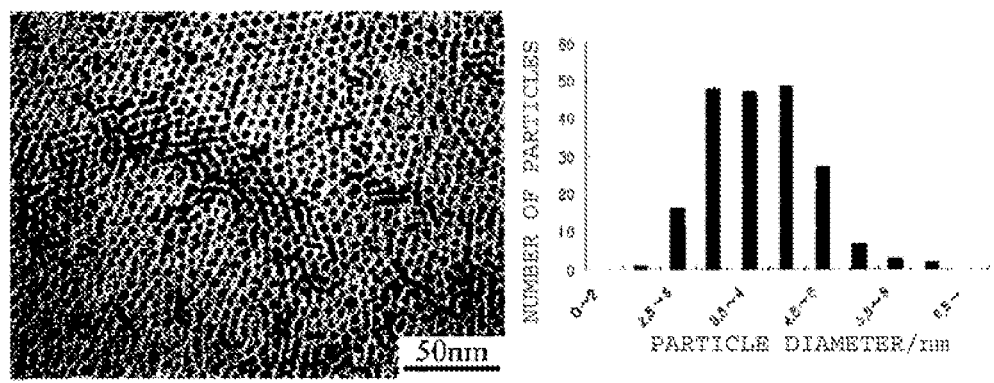
FIG. 26 shows a TEM image and the particle size distribution of the powder obtained in Example 11.

A bluish-purple powder (yield 2.5 g, metal content 85%, compositional ratio silver 59 mol %:copper 41 mol %, mean particle diameter 3.9±0.71 nm) was obtained by a reaction similar to that of Example 4 except that the scale of Example 4 was increased 5-fold. FIG. 24 shows the results for thermogravimetric (TG) change according to TG/DTA measurement, FIG. 25 shows the results of X-ray diffraction analysis (XRD), and FIG. 26 shows a TEM image and the particle size distribution of the resulting powder.

Example 12

Synthesis of $C_{13}Ag/(C_7)_2Cu/(C_8)_3N/1,2$-DDO

Silver:Copper=5:5, 160° C.×16 Hours

Figure 27:
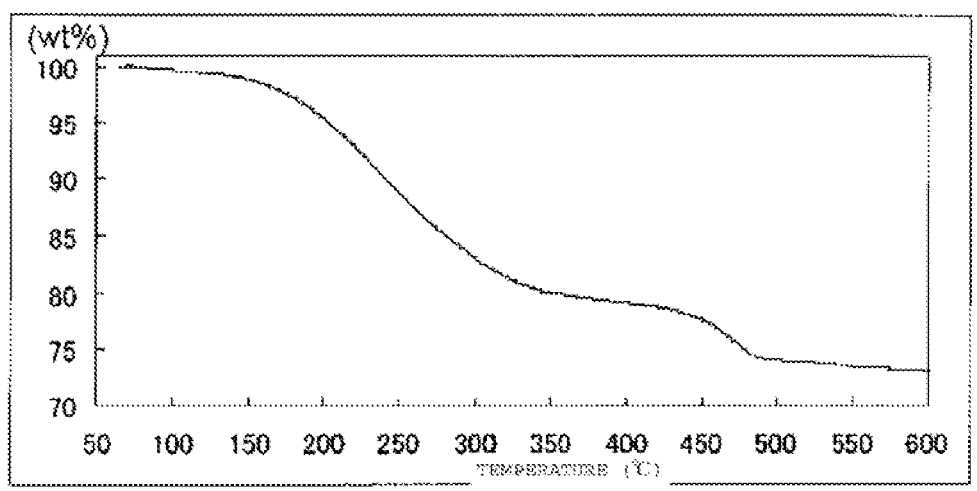
FIG. 27 shows the results for thermogravimetric (TG) change according to TG/DTA measurement of the powder obtained in Example 12.
Figure 28:
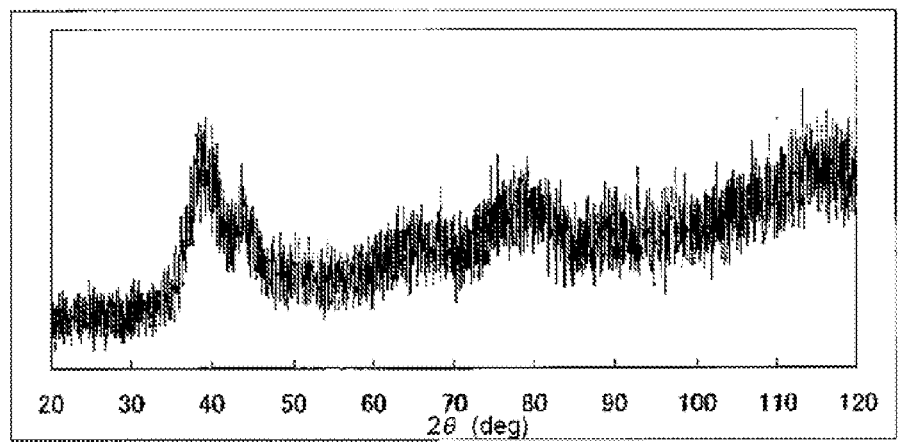
FIG. 28 shows the results of X-ray diffraction analysis (XRD) of the powder obtained in Example 12.
Figure 29:
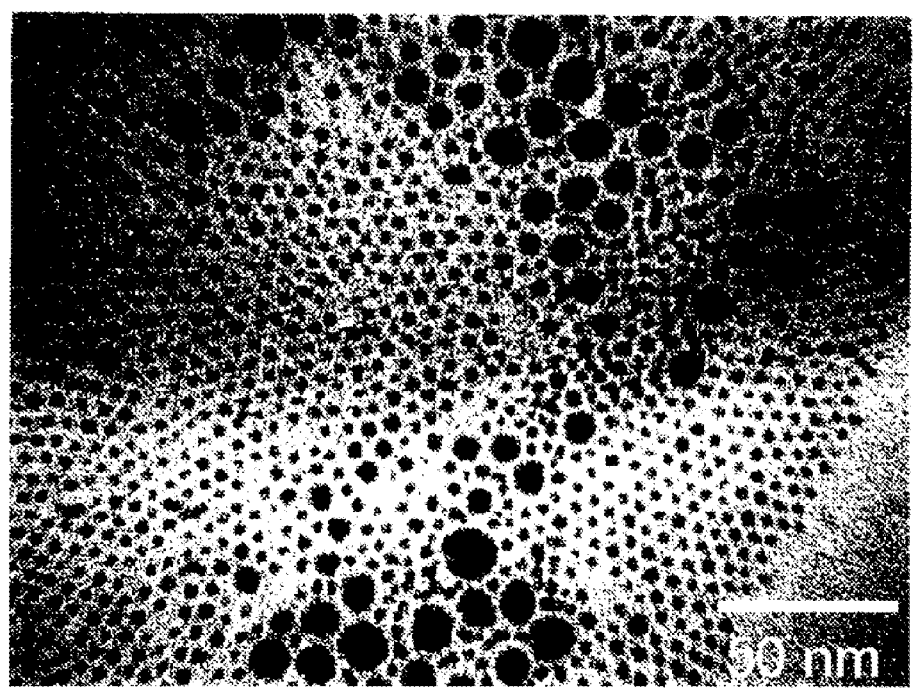
FIG. 29 shows a TEM image of the powder obtained in Example 12.

A bluish-purple powder (yield 0.585 g, metal content 73%, compositional ratio silver 57 mol %:copper 43 mol %, mean particle diameter 3.59±0.52 nm) was obtained by heat treatment under conditions similar to those of Example 3, but with the addition of 1.52 g (7.5 mmol) 1,2-DDO. FIG. 27 shows the results for thermogravimetric (TG) change according to TG/DTA measurement, FIG. 28 shows the results of X-ray diffraction analysis (XRD), and FIG. 29 shows a TEM image of the resulting powder.

Example 13

Synthesis of $C_{13}Ag/(C_7)_2Cu/(C_8)_3N/1,2$-DDO

Silver:Copper=8:2, 160° C.×16 Hours

Figure 30:
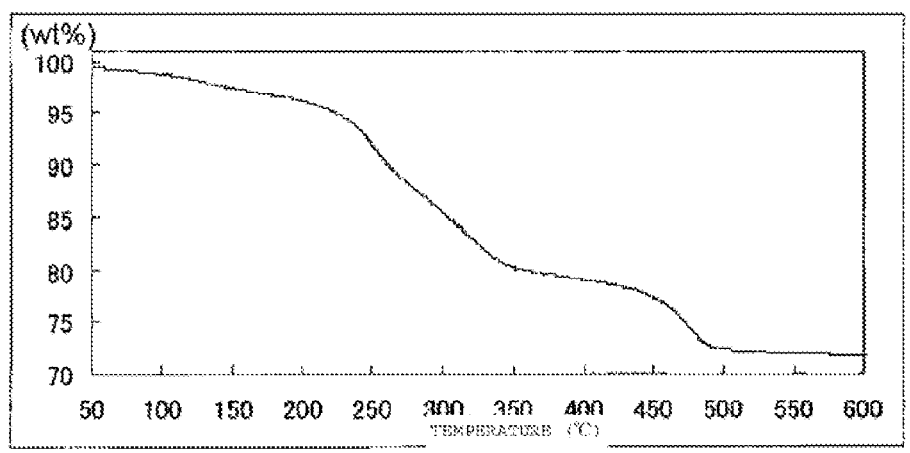
FIG. 30 shows the results for thermogravimetric (TG) change according to TG/DTA measurement of the powder obtained in Example 13.
Figure 31:
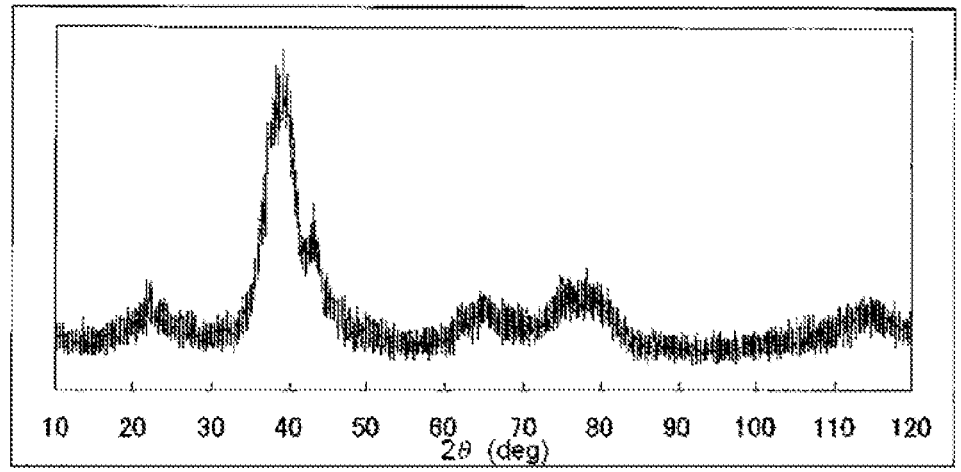
FIG. 31 shows the results of X-ray diffraction analysis (XRD) of the powder obtained in Example 13.
Figure 32:
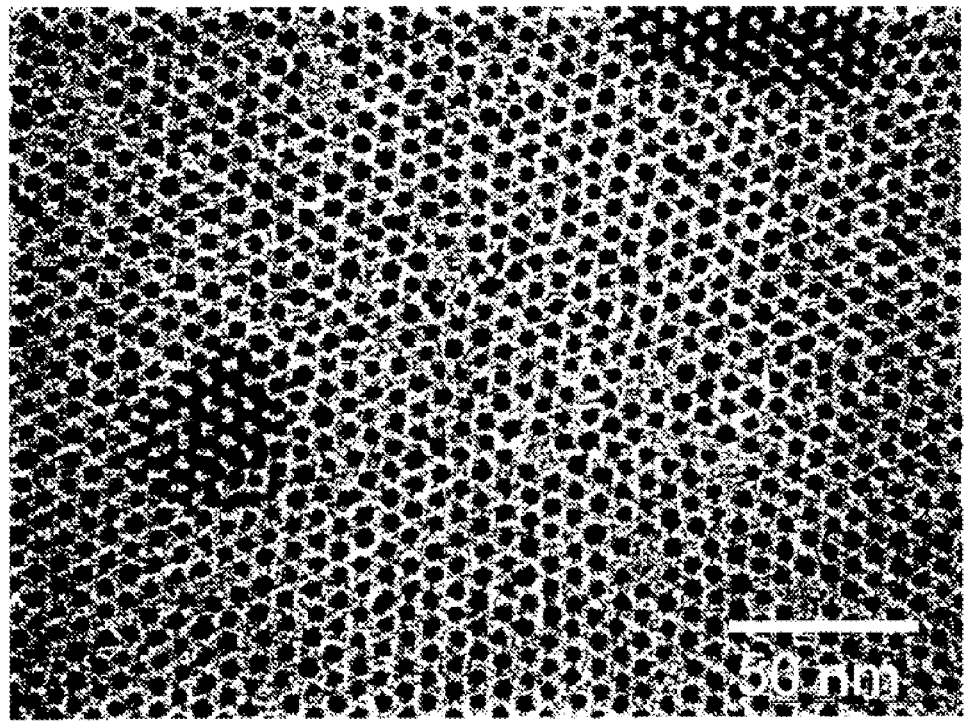
FIG. 32 shows a TEM image of the powder obtained in Example 13.

A bluish-purple powder (yield 0.66 g, metal content 72%, compositional ratio silver 85 mol %:copper 15 mol %, mean particle diameter 4.23±0.36 nm) was obtained by heat treatment as in Example 12 except that the amounts of the reagents added in Example 12 were changed to 1,2-DDO 1.21 g (6 mmol), $(C_8)_3N$ (2.12 g, 6 mmol), $(C_7COO)_2Cu$ (0.35 g, 1 mmol) and $C_{13}COOAg$ (1.34 g, 4 mmol). FIG. 30 shows the results for thermogravimetric (TG) change according to TG/DTA measurement, FIG. 31 shows the results of X-ray diffraction analysis (XRD), and FIG. 32 shows a TEM image of the resulting powder.

Example 14

Synthesis of $C_{13}Ag/(C_7)_2Cu/(C_8)_3N/1,2$-DDO

Silver:Copper=2:8, 160° C.×16 Hours

Figure 33:
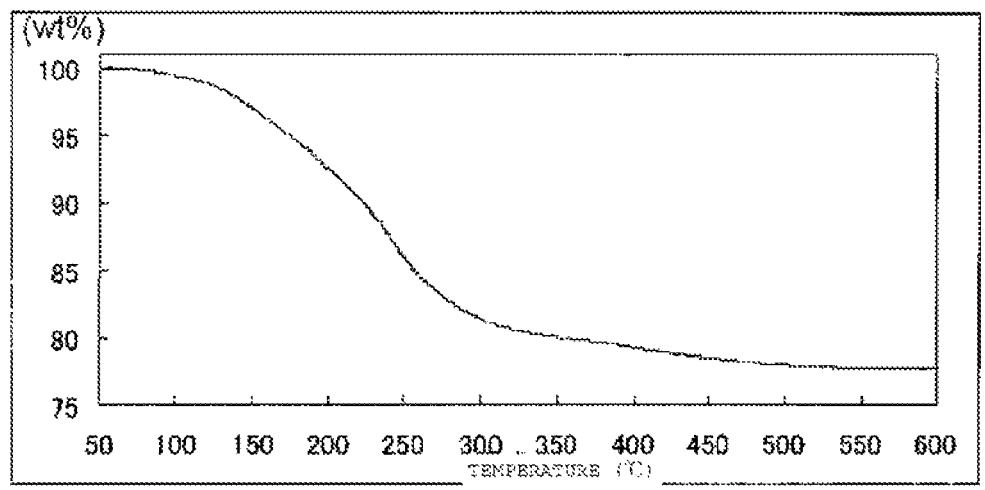
FIG. 33 shows the results for thermogravimetric (TG) change according to TG/DTA measurement of the powder obtained in Example 14.
Figure 34:
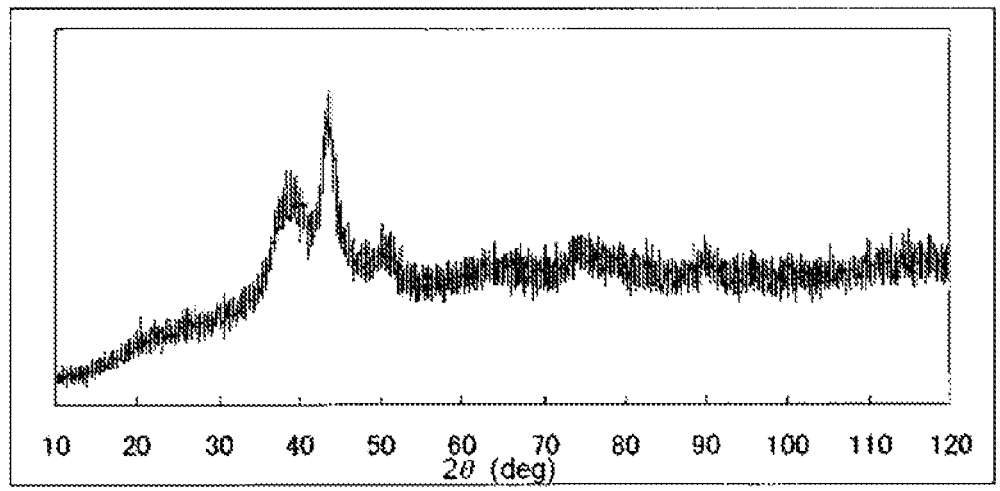
FIG. 34 shows the results of X-ray diffraction analysis (XRD) of the powder obtained in Example 14.
Figure 35:
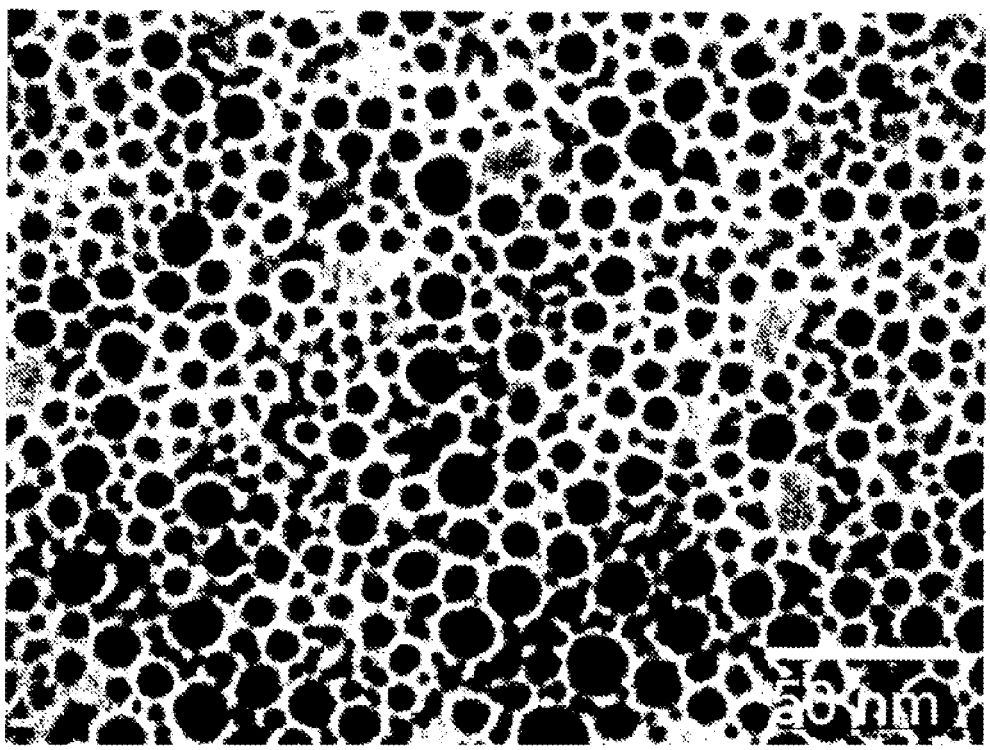
FIG. 35 shows a TEM image of the powder obtained in Example 14.

A bluish-purple powder (yield 0.483 g, metal content 78%, compositional ratio silver 26 mol %:copper 74 mol %, mean particle diameter 5.50±2.73 nm) was obtained by heat treatment as in Example 12 except that the amounts of the reagents added in Example 12 were changed to 1,2-DDO 1.82 g (9 mmol), $(C_8)_3N$ (3.18 g, 9 mmol), $(C_7COO)Cu$ (1.40 g, 4 mmol) and $C_{13}COOAg$ (0.335 g, 1 mmol). FIG. 33 shows the results for thermogravimetric (TG) change according to TG/DTA measurement, FIG. 34 shows the results of X-ray diffraction analysis (XRD), and FIG. 35 shows a TEM image of the resulting powder.

Example 15

Synthesis of $C_{13}Ag/(C_7)_2Cu/(C_8)_3N/1,2$-DDO

Silver:Copper=5:95, 160° C.×16 Hours

Figure 36:
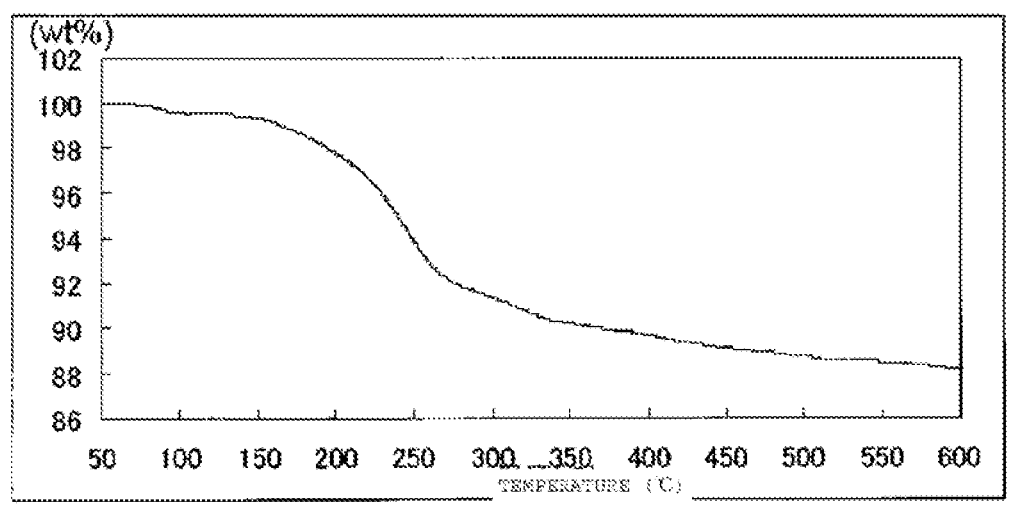
FIG. 36 shows the results for thermogravimetric (TG) change according to TG/DTA measurement of the powder obtained in Example 15.
Figure 37:
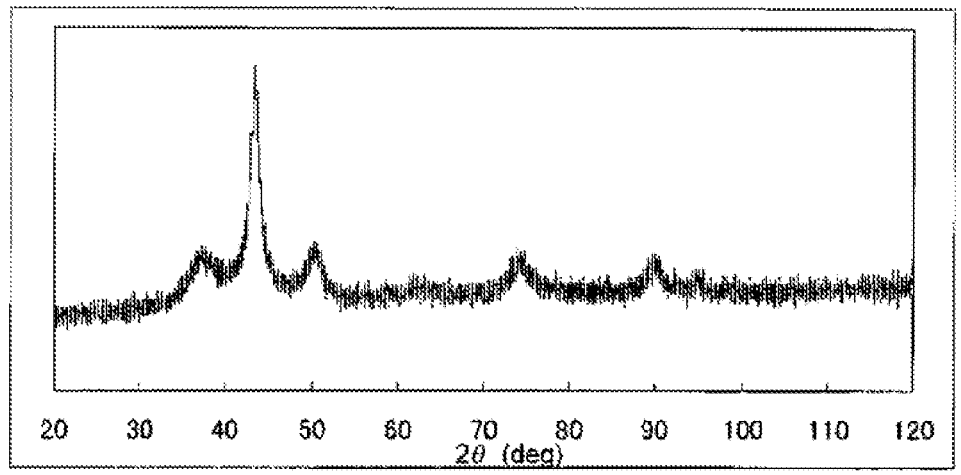
FIG. 37 shows the results of X-ray diffraction analysis (XRD) of the powder obtained in Example 15.
Figure 38:
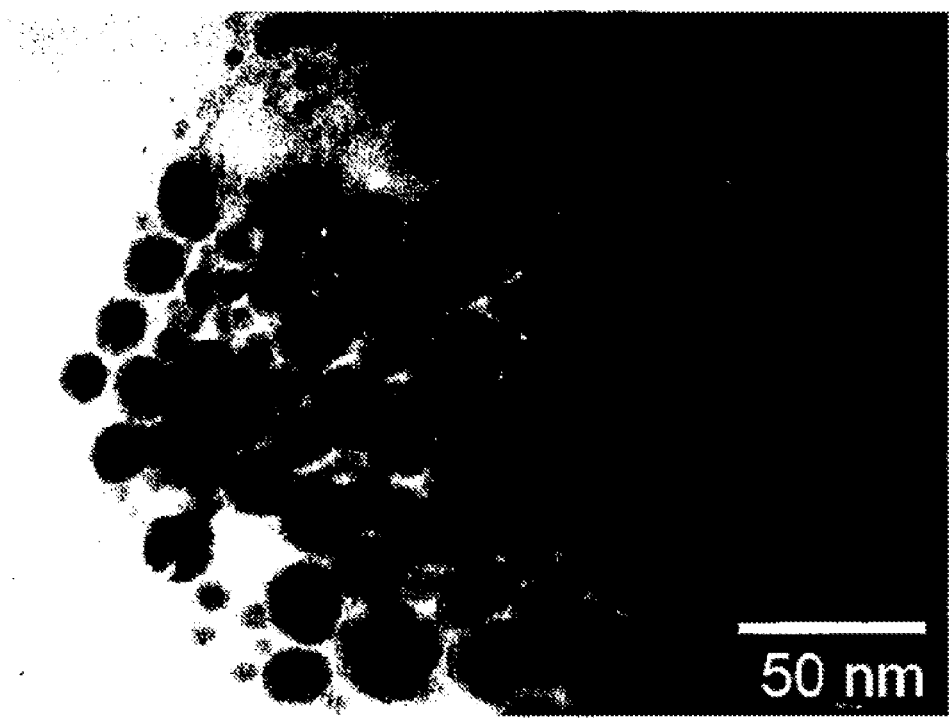
FIG. 38 shows a TEM image of the powder obtained in Example 15.

A brown powder (yield 373 mg, metal content 88%, compositional ratio silver 7 mol %:copper 93 mol %, mean particle diameter 10.42±5.23 nm) was obtained by heat treatment as in Example 12 except that the amounts of the reagents added in Example 12 were changed to 1,2-DDO 1.97 g (9.75 mmol), $(C_8)_3N$ (3.45 g, 9.75 mmol), $(C_7COO)_2Cu$ (1.66 g, 4.75 mmol) and $C_{13}COOAg$ (0.084 g, 0.25 mmol). FIG. 36 shows the results for thermogravimetric (TG) change according to TG/DTA measurement, FIG. 37 shows the results of X-ray diffraction analysis (XRD), and FIG. 38 shows a TEM image of the resulting powder.

Example 16

Synthesis of $Ag_2CO_3/(C_7)_2Cu/(C_8)_3N/C_7COOH$

Silver:Copper=2:8, 160° C.×24 Hours

Figure 39:
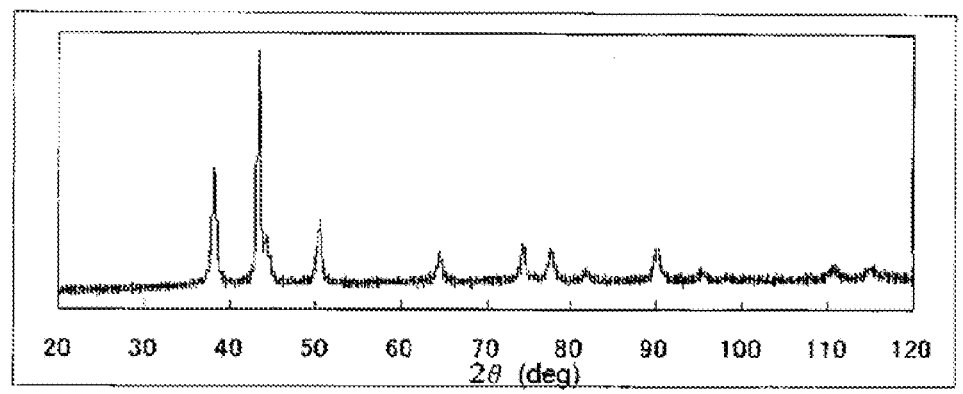
FIG. 39 shows the results of X-ray diffraction, analysis (XRD) of the powder obtained in Example 16.
Figure 40:
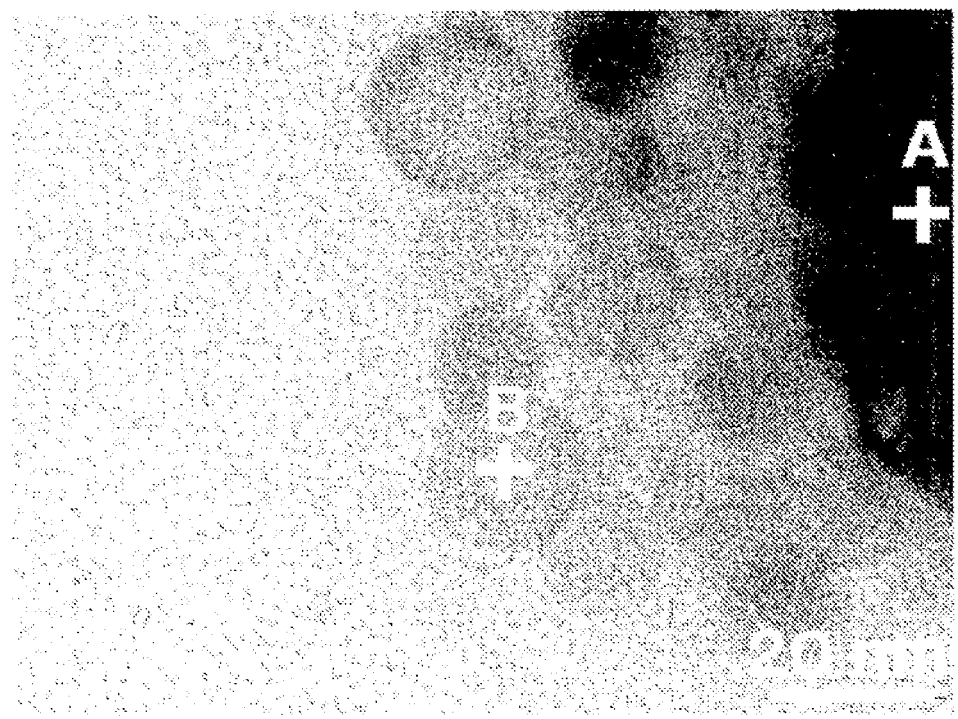
FIG. 40 shows a TEM image of the powder obtained in Example 16.

A bluish-purple powder (yield 0.366 g, metal content 99%, compositional ratio silver 25 mol %:copper 75 mol %, mean particle diameter 31.4±36.7 nm (mixture of 17.6±3.4 nm and 120.6±26.5 nm mean particle diameters)) was obtained by heat treatment as in Example 10 except that the $C_{17}COOAg$ of Example 10 was changed in $Ag_2CO_3$ (0.138 g, 0.5 mmol), and $C_7COOH$ (0.144 g, 1 mmol) was also added. FIG. 39 shows the results of X-ray diffraction analysis (XRD) and FIG. 40 shows a TEM image of the resulting powder.

The Ag/Cu bimetal nanoparticles obtained in Example 16 were also subjected to TEM/EDX analysis. The Ag/Cu compositional ratios of both the large-diameter particles A and small-diameter particles B were investigated. The results are shown in Table 1. As shown by the results of Table 1, both silver and copper were contained in individual particles. Copper-rich particles (FIG. 40, measurement point A) were found mixed with silver-rich particles (FIG. 40, measurement point B). Moreover, it was found that in the particles (powder) obtained in Example 16 the compositional ratio differed according to particle diameter, with the silver-rich particles A having a smaller particle diameter than the copper-rich particles B. It is believed that after decomposition of the $Ag_2CO_3$, which has a relatively low decomposition temperature, $(C_7COO)_2Cu$ then breaks down and the silver and copper begin to mix and form stable silver-rich particles having a small particle diameter before the silver and copper mix completely, and stable copper-rich particles having a large particle diameter when the silver and copper mix completely.

TABLE 1

| Measurement point (FIG. 40) | Compositional ratio (silver:copper) (mol %) | Particle diameter (nm) |
| --- | --- | --- |
| A | 35:65 | 97.1 |
| B | 80:20 | 19.8 |

Test Example 1

Properties of Baked Film of Ag/Cu Composite Nanoparticles

Figure 41:
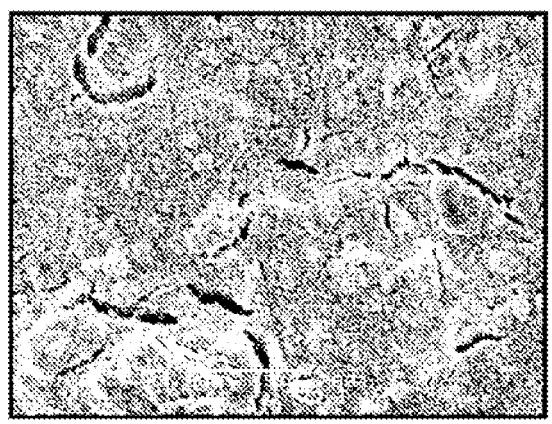
FIG. 41 shows a SEM photograph of the surface of a coat obtained by baking in atmosphere at 350° C. for 30 minutes in Test Example 1.
Figure 42:
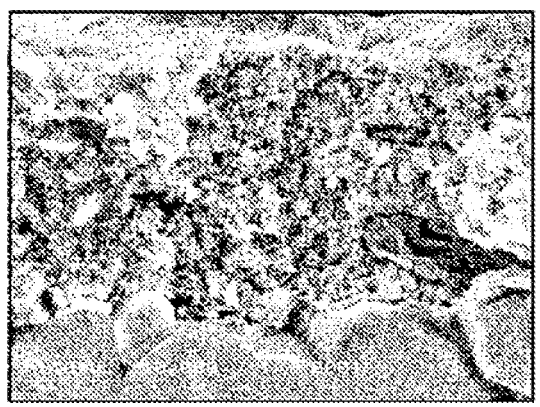
FIG. 42 shows a SEM photograph of a cross-section of a coat obtained by baking in atmosphere at 350° C. for 30 minutes in Test Example 1.

A polyethylene dispersant (0.08 g) and terpineol (0.25 g) as a solvent were added to the Ag/Cu composite nanoparticles $C_{13}Ag/(C_7)_2Cu/(C_8)_3N$ (Ag:Cu=5:5, 180° C.×4 hours) prepared in Example 11, and several drops of toluene were dripped in to promote dispersibility. This was mixed under the toluene vaporised with no residue, to prepare a paste with a metal content of 65 wt %. An electrode pattern was printed by screen printing using this paste, and baked in air for 30 minutes at 350° C. FIGS. 41 and 42 show surface and cross-sectional SEM photographs of this baked film A, respectively.

Figure 43:
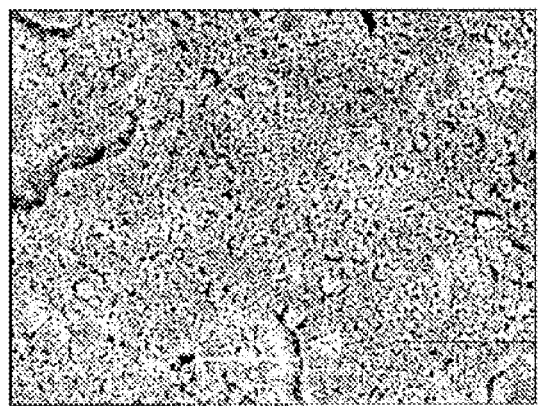
FIG. 43 shows a SEM photograph of the surface of a coat obtained by baking in atmosphere at 350° C. for 30 minutes and then baking in a reducing atmosphere at 350° C. for 30 minutes in Test Example 1.
Figure 44:
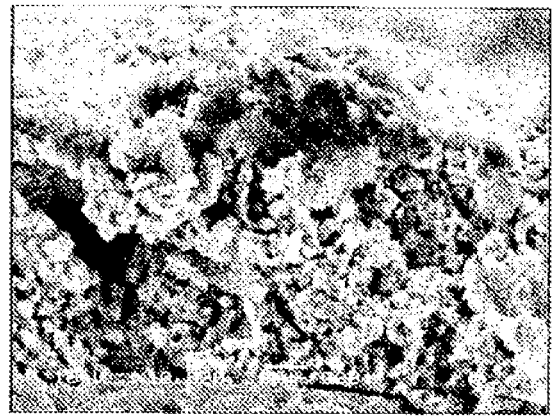
FIG. 44 shows a SEM photograph of a cross-section of a coat obtained by baking in atmosphere at 350° C. for 30 minutes and then baking in a reducing atmosphere at 350° C. for 30 minutes in Test Example 1.

An electrode pattern printed and prepared in the same way was baked separately in air for 30 minutes at 350° C., and then baked for 30 minutes at 350° C. in a reducing atmosphere comprising 3 vol % hydrogen in nitrogen. FIGS. 43 and 44 show surface and cross-sectional SEM photographs of the resulting thin film B, respectively.

As shown in FIGS. 41 and 42, baking in air produced a baked film in which the particles maintained their shapes. As shown in FIGS. 43 and 44, on the other hand, baking in air followed by baking in a reducing atmosphere comprising 3 vol % hydrogen in nitrogen produced a thin film in which the nanoparticles had fused. That is, even at relatively low baking temperatures a coat is obtained having an internal structure in which the nanoparticles are fused together rather than retaining their original forms.

The electrical characteristics of thin film B are shown in Table 2. While the specific resistance is normally about 100 μΩcm in the case of a film such as baked film A, thin film B has a specific resistance of 10 μΩcm or less (especially 8 μΩcm or less) as shown in Table 2, comparable to that of bulk metal. Such a paste using Ag/Cu composite nanoparticles can be used favorably not only for wiring formation, but also for bonding purposes as a substitute for high-temperature solder.

TABLE 2

| Entry | Baking conditions | | Film thickness μm | Specific resistance μΩcm |
| --- | --- | --- | --- | --- |
| 1 | 350° C. | 350° C. | 6.1 | 7.69 |
| 2 | Air | $N_2 + 3\%H_2$ | 5.77 | 7.27 |
| 3 | | | 6.02 | 7.59 |
| Mean value | | | 5.96 | 7.51 |

Test Example 2

Investigation of Migration Resistance of Ag/Cu Composite Nanoparticles

Ion migration is a phenomenon by which metal of the anode ionizes and is eluted when current is supplied to the electronic circuit under high-humidity high-temperature conditions, causing short-circuits between electrodes. The electrodes used to investigate stability with respect to ion migration were formed using the $C_{13}Ag/(C_7)_2Cu/(C_8)_3N$ (silver:copper 5:5, 180° C.×4 hours) synthesized in Example 11 and silver nanoparticles synthesized under the same conditions. To form the electrodes, a dispersant (0.08 g) and terpineol as a solvent (0.25 g) were added to an agate bowl, and toluene was dripped in to promote dispersibility. The aforementioned nanoparticles were then added and mixed until the toluene vaporised with no residue, to obtain a paste. An electrode pattern was printed by screen printing using this paste, and baked at 350° C. for 30 minutes in a reducing atmosphere comprising 3% hydrogen in nitrogen to form the electrode. An ion migration test was performed using the formed electrodes (distance between electrodes 1 mm). The ion migration test was performed by the water drop method, by dripping water between the electrodes and measuring the time it took for the electrodes to short-circuit after current was supplied. The results are shown in Table 3.

As shown by the results of Table 3, the time to short-circuit was 15 seconds in the case of the electrode formed using silver nanoparticles. In the case of the electrode formed using $C_{13}Ag/(C_7)_2Cu/(C_8)_3N$ (silver:copper 5:5), the time to short-circuit was 530 seconds, or about 35 times the time to short-circuit in the case of the electrode formed using silver nanoparticles. This shows that $C_{13}Ag/(C_7)_2Cu/(C_8)_3N$ (silver:copper=5:5, 180° C.×4 hours) has much greater migration resistance than silver nanoparticles.

TABLE 3

| Electrodes (interelectrode distance 1 mm) | Time to short-circuit between electrodes (sec) |
| --- | --- |
| Electrode formed with silver nanoparticles | 15 |
| Electrode formed with silver-copper composite nanoparticles of invention | 530 |

The invention claimed is:

1. A method for manufacturing composite nanoparticles, comprising a step of obtaining composite nanoparticles containing at least silver and copper in a single particle by
heat treating a mixture containing an organic silver compound and an organic copper compound at a temperature of 150° C. or more in a non-oxidative atmosphere in the presence of:
a tertiary amine compound represented by the general formula $R^1R^2R^3N$, wherein $R^1$ to $R^3$ independently represent an alkyl group or aryl group that may have a substituent, $R^1$ to $R^3$ may be linked together to form a cyclic structure, and the number of carbon atoms in each of $R^1$ to $R^3$ is 1 through 18 and may be the same or different, and
a 1,2-alkanediol having 10 or more carbon atoms and/or a derivative thereof,
wherein the X-ray diffraction pattern of the composite nanoparticles shows peaks of silver and peaks of copper.

2. The manufacturing method according to claim 1, wherein 0.8 A≤A'≤1.2 A is satisfied given A as an input molar ratio of the organic silver compound relative to the total of the organic silver compound and the organic copper compound, and A' as a molar ratio of a silver component relative to the total of the silver component and a copper component in the composite nanoparticles.

3. The manufacturing method according to claim 2, wherein the input molar ratio A is at least 1% but no more than 99%.

4. The manufacturing method according to claim 1, wherein the heat treatment temperature is 250° C. or less.

5. The manufacturing method according to claim 1, wherein the organic silver compound is a fatty acid silver and the organic copper compound is a fatty acid copper.

6. Composite nanoparticles comprising an organic component and containing at least silver and copper in a single particle, wherein the nanoparticles comprise particles containing more silver than copper in each particle and particles containing more copper than silver in each particle,
wherein the organic component contains an organic component produced when a tertiary amine compound and 1,2-alkanediol having 10 or more carbon atoms and/or derivative thereof used as starting materials are subjected to a heat treatment at a temperature of 150° C. or more, and
wherein the X-ray diffraction pattern of the composite nanoparticles shows peaks of silver and peaks of copper.

7. The composite nanoparticles according to claim 6, wherein a molar ratio of the silver component relative to the total of the silver component and the copper component in the composite nanoparticles is at least 1% but no more than 99%.

8. The composite nanoparticles according to claim 6, which are used for forming migration-resistant wiring.

9. The composite nanoparticles according to claim 6, which are used for migration-resistant bonding purposes.

10. A paste containing the composite nanoparticles according to claim 6 and at least one of a solvent and a viscosity modifying resin.

11. The composite nanoparticles according to claim 6, wherein the tertiary amine compound is represented by the general formula $R^1R^2R^3N$ wherein $R^1$ to $R^3$ independently represent an alkyl group or aryl group that may have a substituent, $R^1$ to $R^3$ may be linked together to form a cyclic structure, and the number of carbon atoms in each of $R^1$ to $R^3$ is 1 through 18 and may be the same or different.

12. The composite nanoparticles according to claim 6, wherein the nanoparticles are in the form of powder.

* * * * *